(12) United States Patent
Burns et al.

(10) Patent No.: US 7,847,034 B2
(45) Date of Patent: Dec. 7, 2010

(54) ADDUCTS AND CURABLE COMPOSITIONS USING SAME

(75) Inventors: Barry N. Burns, Killiney (IE); Ray P. Tully, Slane (IE); Jonathan P. Wigham, Rathfarnham (IE)

(73) Assignee: Loctite (R&D) Limited, Dublin (IE)

( * ) Notice: Subject to any disclaimer, the term of this patent is extended or adjusted under 35 U.S.C. 154(b) by 198 days.

(21) Appl. No.: 12/051,871

(22) Filed: Mar. 20, 2008

(65) Prior Publication Data

US 2009/0240003 A1    Sep. 24, 2009

(51) Int. Cl.
*C08L 63/00* (2006.01)
*C08L 83/14* (2006.01)

(52) U.S. Cl. .................. 525/528; 525/410; 525/476; 525/540; 525/909; 528/28; 528/65; 528/76

(58) Field of Classification Search ............... None
See application file for complete search history.

(56) References Cited

U.S. PATENT DOCUMENTS

| | | | |
|---|---|---|---|
| 3,114,734 A | 12/1963 | Gobran et al. |
| 4,419,496 A | 12/1983 | Henton et al. |
| 4,607,091 A | 8/1986 | Schreiber |
| 4,778,851 A | 10/1988 | Henton et al. |
| 5,021,484 A | 6/1991 | Schreiber |
| 5,200,452 A | 4/1993 | Schreiber |
| 5,278,257 A | 1/1994 | Mulhaupt et al. |
| 5,382,635 A | 1/1995 | McInnis et al. |
| 5,443,911 A | 8/1995 | Schreiber |
| 5,506,283 A | 4/1996 | McInnis et al. |
| 5,543,516 A | 8/1996 | Ishida |
| 5,693,714 A | 12/1997 | Bauman et al. |
| 5,969,053 A | 10/1999 | Bauman et al. |
| 5,981,659 A | 11/1999 | Geck et al. |
| 6,111,015 A | 8/2000 | Edlin et al. |
| 6,147,142 A | 11/2000 | Geck et al. |
| 6,180,693 B1 | 1/2001 | Tang et al. |
| 2009/0176945 A1 * | 7/2009 | Bojkova et al. ............ 525/453 |

FOREIGN PATENT DOCUMENTS

| | | |
|---|---|---|
| BE | 735 738 | 1/1970 |
| EP | 0 066 167 | 12/1982 |
| EP | 0 200 861 | 11/1986 |
| EP | 0 231 760 | 8/1987 |
| EP | 0 303 927 | 2/1989 |
| FR | 1 525 806 | 5/1968 |
| FR | 1 601 407 | 8/1970 |
| GB | 1 329 112 | 9/1973 |
| WO | WO 2004/108825 | 12/2004 |
| WO | WO 2005/007766 | 1/2005 |
| WO | WO 07/064801 | 6/2007 |

OTHER PUBLICATIONS

Burke et al., "A New Aminoalkylation Reaction. Condensation of Phenols With Dihydro-1,3-aroxazines." *J. Org. Chem.* 30(10), 3423 (1965).

* cited by examiner

*Primary Examiner*—Marc S Zimmer
(74) *Attorney, Agent, or Firm*—Steven C. Bauman

(57) ABSTRACT

The present invention relates to adducts useful for improving the toughness and curable compositions using such toughening adducts. In a particular aspect, the present invention relates to inventive toughening adducts and curable compositions having improved fracture toughness using those toughening adducts.

8 Claims, No Drawings

ADDUCTS AND CURABLE COMPOSITIONS USING SAME

BACKGROUND OF THE INVENTION

1. Field of the Invention

The present invention relates to adducts useful for improving toughness, and curable compositions using such adducts. The inventive adducts may improve toughness, such as in terms of impact resistance, and/or adhesion in curable compositions using those adducts.

2. Brief Description of Related Technology

Toughness generally is the ability of a material to absorb energy and undergo large permanent set without rupture. For many engineering adhesive applications, toughness is often the deciding factor. Plastics, because of their inherent brittleness, have heretofore been modified in a variety of ways in efforts to improve the toughness thereof. Epoxy resins, for example, which form a versatile glassy network when cured, exhibit excellent resistance to corrosion and solvents, good adhesion, reasonably high glass transition temperatures ($T_g$) and adequate electrical properties. Unfortunately, however, the poor fracture toughness of epoxy resins oftentimes limits the usefulness thereof in many commercial applications.

The impact strength, as well as other physical properties of crosslinked epoxy resins, is controlled by the chemical structure and molecular weight of the epoxy resin, weight ratio of the epoxy resin to the hardener, by any added fillers, and by the conditions used to cure the formulation. Unfortunately, crosslinked, glassy epoxy resins with a relatively high glass transition temperature ("$T_g$") (>100° C.) are brittle in nature. The poor impact strength of high glass transition epoxy resins limits their usage as structural materials and use in or as composites.

Conventional toughening agents (e.g., carboxyl terminated butadiene nitrile rubbers, "CTBN") are frequently unsuitable as additives in formulations where low temperature crash impact performance is desired.

In addition, U.S. Pat. No. 5,278,257 (Mulhaupt) and International Patent Publication No. WO 2005/007766 A1 describe the preparation of a rubber modified epoxy composition containing a phenol-capped polyurethane pre-polymer as a toughening agent. The so-described toughening agents are believed to be the basis of the BETAMATE-brand product offering from Dow Automotive.

The low temperature performance properties of such BETAMATE-brand products could stand improvement. In addition, consumers would benefit from the offering of additional adducts and products using such adducts having different or more desirable physical property performance.

Accordingly, there is a need for inventive adducts that are effective for improving the toughness of adhesive formulations, especially in formulations requiring good low temperature performance, and which formulations are based on thermosets such as epoxy, episulfides and/or benzoxazines.

SUMMARY OF THE INVENTION

In accordance with the present invention, there are provided inventive adducts which are useful for improving the performance properties of thermosetting resin formulations, such as those based on epoxy, episulfide, benzoxazine and combinations thereof. The performance properties include improved impact resistance especially at low temperature, and adhesion to substrate surfaces.

The inventive adducts may be represented by compounds within general formula I.

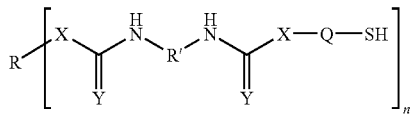

where R is selected from backbones of polyethers, perfluorinated polyethers, polyesters, perfluorinated polyesters, polydimethylsiloxanes or hydroxy terminated polybutadienes;

R' and Q are independent from one another and are selected from alkylene, arylene, alkyleneoxy or aryleneoxy;

X is selected from O, NH, S, S=O, and O=S=O;

Y is selected from O or S; and n is 1-4.

R thus may be selected from polyethers, such as polypropylene glycol ("PPG") and polyTHF, perfluorinated polyethers ("PFP"), JEFFAMINE type backbones (as more fully described below), polydimethylsiloxane ("PDMS") backbones (again, as more fully described below), LP3 type backbones (as more fully described below), and hydroxy terminated polybutadiene ("HPBD") backbones.

In order to improve low temperature fracture toughness performance properties, while conferring improved adhesion on substrates, such as steel, the inventive adducts should also have a low Tg value, such as below room temperature, desirably −20° C. and more desirably −40° C. or lower. In addition, other physical properties of the adduct may contribute to such low temperature performance, such as compatibility with the thermoset matrix and solubility parameters generally. To that end, the level of PDMS in R of the adduct, for instance, may be adjusted if desired within the range of about 5 to about 95%, such as about 20 to about 80%, desirably about 20% by weight of R in the adduct, to provide the adduct with the desirable Tg, particularly for improving wedge impact performance and improved adhesion. To the extent that R in the adduct is composed of a second (or third) backbone, the remaining portion of R may be a non-silicon-containing segment, such as one derived from a polypropylene glycol, of course bearing appropriate functionalization.

Adducts within general formula I may be useful as additives in one part thermosetting resin compositions, so as to improve physical properties, such as tensile peel strength values, tensile shear strength values and wedge impact properties.

DETAILED DESCRIPTION OF THE INVENTION

As noted above, the present invention provides inventive adducts which are useful for improving the performance properties of thermosetting resin formulations, such as those based on epoxy, episulfide, benzoxazine and combinations thereof.

The inventive adducts may be represented by compounds within general formula I.

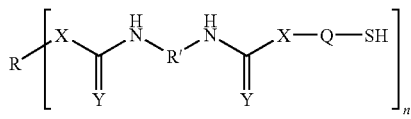

where R is selected from backbones of polyethers, perfluorinated polyethers, polyesters, perfluorinated polyesters, polydimethylsiloxanes or hydroxy terminated polybutadienes;

R' and Q are independent from one another and are selected from alkylene, arylene, alkyleneoxy or aryleneoxy;

X is selected from O, NH, S, S=O, and O=S=O;

Y is selected from O or S; and n is 1-4.

R and R' are each independently selected from polyethers, such as PPG and polyTHF, PFP, JEFFAMINE type backbones, PDMS backbones, LP-3 type backbones, and hydroxy terminated polybutadiene ("HPBD") backbones.

With reference to the building blocks used to prepare the inventive adducts, the linkage represented by "R" may be formed from polyethers functionalized with one or more of hydroxy, mercapto and amino groups. Such polyethers may originate from commercially available starting materials, for instance the amine-functionalized polyethers sold under the JEFFAMINE tradename, the mercapto-functionalized polythioethers sold under the LP-3 tradename and/or the hydroxy-functionalized polyethers sold under the trade designation, PPG.

Each of these building blocks are available commercially, or can be prepared, in a variety of molecular weights. With the different molecular weights, physical property changes can be imported into the inventive adduct to tailor the adduct for the specific end use application for which it is intended.

Amine-functionalized polyethers include oxyethylene diamines, oxyethylene triamines, polyoxyethylene diamines, polyoxyethylene triamines, oxypropylene diamines, oxypropylene triamines, polyoxypropylene diamines, polyoxypropylene triamines, dimethylene glycol dipropyl amine and/or derivatives and adducts thereof, and combinations thereof.

Commercially available examples of such polyether amine-based hardeners—amine-functionalized polyethers—include those from BASF Corporation, Mt. Olive, N.J., under the trade designation 4,7,10 TTD, and Huntsman Corporation, Houston, Tex., under the JEFFAMINE tradename, such as JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof.

The JEFFAMINE D series are diamine based products and may be represented by

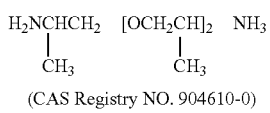

(CAS Registry NO. 904610-0)

where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by

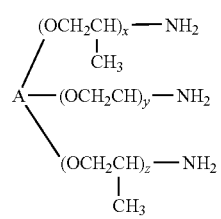

where x, y and z are set forth below in Table A.

TABLE A

| JEFFAMINE | Initiator (A) | Approx. Mol. Wt | Mole PO |
|---|---|---|---|
| T-403 | Trimethylolpropane | 440 | 5-6 |
| T-3000 | Glycerine | 3,000 | 50 |
| T-5000 | Glycerine | 5,000 | 85 |

More specifically, the JEFFAMINE T-403 product is a trifunctional amine and may be represented by

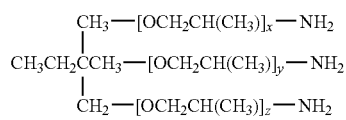

where x+y+z is 5.3 (CAS Registry No. 39423-51-3).

The JEFFAMINE ED series are polyether diamine-based products and may be represented by

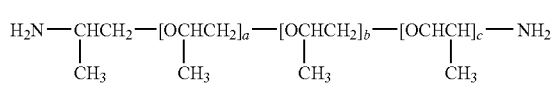

where a, b and c are set forth below in Table B.

TABLE B

| JEFFAMINE | Approx. Value b | Approx. Value a + c | Approx. Mol. Wt |
|---|---|---|---|
| ED-600 | 8.5 | 2.5 | 600 |
| ED-900 | 15.5 | 2.5 | 900 |
| ED-2001 | 40.5 | 2.5 | 2,000 |

As the mercapto-functionalized polythioethers, many materials may be used. For instance, polysulfides of the general formulae may be used

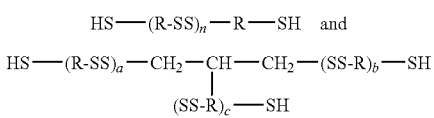

where R is an alkyl ether, such as —$(CH_2)_2$—O—$CH_2$—O—$(CH_2)_2$—, and a+b+c=n.

A particularly desirable material is known as THIOKOL LP-3, available commercially from Rohm and Haas Company, Philadelphia, Pa., where n is 6 and about 2 mole percent branching exists. LP-3 is also reported to have a molecular weight of about 1,000.

Another particularly desirable material is available commercially from Akcros Chemicals, Manchester, Great Britain under the tradename THIOPLAST, such as G1 (n is 19-21, 1.8-2 percent thiol content, and a 3,300-3,700 molecular weight), G4 (n is less than 7, less than 5.9 percent thiol content, and less than 1,100 molecular weight), G12 (n is 23-26, 1.5-1.7 percent thiol content, and a 3,900-4,400 molecular weight), G21 (n is 12-15, 2.5-3.1 percent thiol content, and a 2,100-2,600 molecular weight), G22 (n is 14-18, 2.1-2.7 percent thiol content, and a 2,400-3,100 molecular weight), G112 (n is 23-25, 1.5-1.7 percent thiol content, and a 3,900-4,300 molecular weight), and G131 (n is 30-38, 1.5-1.7 percent thiol content, and a 5,000-6,500 molecular weight). The THIOPLAST materials are reported to be prepared from the polycondensation of bis-(2-chloroethyl) formal with alkali polysulfide.

(Meth)acrylate-functionalized polydimethyl siloxanes of various molecular weights may be used as the building block for this portion of the adduct, as well.

Commercial sources for such (meth)acrylate-functionalized polydimethyl siloxanes include Genesee Silicone, Gelest Silicone and Wacker Silicones. For instance, methacryloxypropyl terminated PDMS [molecular weight 900-1200] is available from Gelest under the trade designation DMS-R11, methacryloxymethyl terminated PDMS [molecular weight ~1360] is available from Wacker under the trade designation SLM 446016-15 VP, 3-acryloxy-2-hydroxypropyl terminated PDMS [molecular weight 1000-1250] is available from Gelest under the trade designation DMS-U22, acryloxy terminated ethylene oxide PDMS [molecular weight 1500-1600] is available from Gelest under the trade designation DBE-U12 and from Goldschmidt under the trade designation TEGO V-Si 2250 [molecular weight ~2500].

Again, the different molecular weights of this segment impact desirable physical properties of the adduct, so that the resulting adduct may be more or less suitable for a variety of end use applications.

A polyalkylene glycol, such as polypropylene glycol [available commercial from Aldrich Chemical Co., molecular weight ~10,000] may also be used as a building block of the inventive adduct. Here, too, different molecular weights of this segment impact desirable physical properties of the adduct, so that the resulting adduct may be more or less suitable for a variety of end use applications.

These materials may be used as building blocks individually or they may be used in various combinations. The intended end use application will suggest to those of ordinary skill in the art whether to choose one or the other or a combination to provide the physical property set beneficial to that end use application.

Thus, for instance in order to prepare the inventive adduct with polyurethane segments, a polyol, such as trimethylol propane, would be reacted under mildly elevated temperature conditions with an isocyanate, desirably a polyisocyanate, such as hexamethylene diisocyanate, in the presence of the building block(s) of the R segments.

Isocyanates suitable for use in this adduct building reaction include polyisocyanates, such as a diisocyanate (for instance an aliphatic, cycloaliphatic, aromatic or araliphatic one) or triisocyanate, or, if desirable, in combination with chain lengtheners (short-chain polyhydroxyl, polysulfhydryl or polyamine compounds), or a polyisocyanate prepolymer derived from a prepolymer polyamine, such as a prepolymer polyetheramine.

A variety of diisocyanates are useful for reaction in this regard and the choice of any particular one will be left to those persons of ordinary skill in the art, likely to be dictated in part by the commercial availability and in part by the end use properties desired.

Useful diisocyanates include ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, dodecamethylene diisocyanate, tetradecamethylene diisocyanate, hexadecamethylene diisocyanate, octadecamethylene diisocyanate, eicosamethylene diisocyanate, cyclohexamethylene diisocyanate, cyclopenthalene diisocyanate, or cyclohepthalene diisocyanate, or bis-cyclohexalene, cyclohexylmethylene diisocyanate, tetramethylxylylene diisocyanate, phenyl diisocyanate, toluene diisocyanate (such as 2,4-diisocyanatotoluene and 2,6-diisocyanatotoluene), 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclohexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, 3,5-diethyl-4,4'-diisocyanatodiphenyl-methane, tetramethylene diisocyanate, hexamethylene diisocyanate, ethylene diisocyanate, cyclohexylene diisocyanate, nonamethylene diisocyanate, octadecamethylene diisocyanate, 2-chloropropane diisocyanate, 2,2'-diethylether diisocyanate, 3-(dimethylamine) pentane diisocyanate, tetrachlorophenylene diisocyanate-1,4,3-heptane diisocyanate and transvinylene diisocyanate.

Additional examples of suitable isocyanates are urethanized 4,4'-diisocyanatodiphenylmethane, carbodiimidized 4,4'-diisocyanatodiphenylmethane, the adduct formed from diisocyanatotoluene and trimethylolpropane, the trimer formed from diisocyanatotoluene, diisocyanato-m-xylylene, N,N'-di-(4-methyl-3-isocyanatophenyl)-urea, mixed trimerization products of diisocyanatotoluene and 1,6-diisocyanatohexamethylene, 1,6-diisocyanatohexane, 3,5,5-trimethyl-1-isocyano-3-isocyanatomethylcyclohexane (isophorene diisocyanate), N,N',N'''-tri-(6-isocyanatohexyl)-biuret, 2,2,4-trimethyl-1,6-diisocyanatohexane, 1-methyl-2,4-diisocyanatocyclohexane, diisocyanate, 4,4'-diisocyanatodicyclohexylmethane, trimeric isophorene, diisocyanate, trimeric hexane diisocyanate and methyl 2,6-diisocyanatohexanoate.

As noted above, chain lengtheners may be used as well, examples of which include diols and polyols, such as 1,4-butanediol, 1,1,1-trimethylolpropane or hydroquinone 2-hydroxyethyl ether, or diamines, such as diaminoethane, 1,6-diaminohexane, piperazine, 2,5-dimethylpiperazine, 1-amino-3-aminomethyl-3,5,5-trimethylcyclohexane, 4,4'-diaminocyclohexylmethane, 1,4-diaminocyclohexane and 1,2-propylenediamine, or hydrazine, amino acid hydrazides, hydrazides of semicarbazidocarboxylic acids, bis-hydrazides and bis-semicarbazides.

The inventive adducts can be readily prepared in a variety of ways, some of which are discussed in the Examples section below.

Specific generalized structures of adducts within general formula I include:

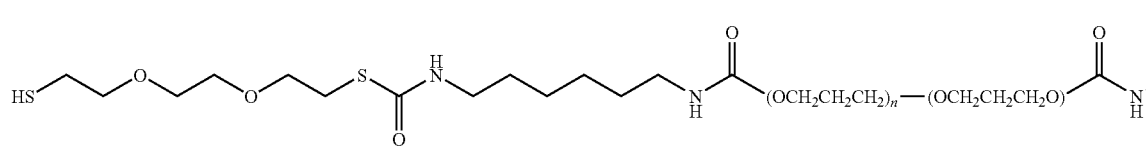

1

-continued
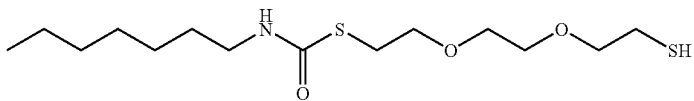
2
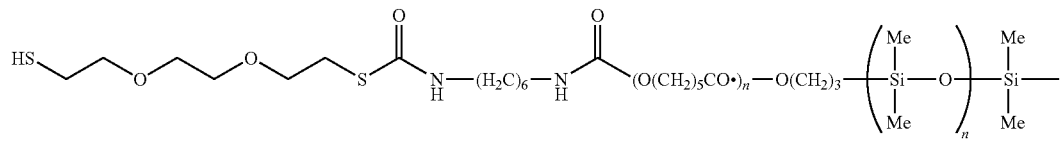
3
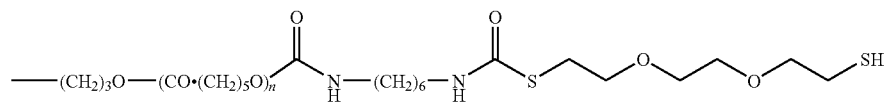
4
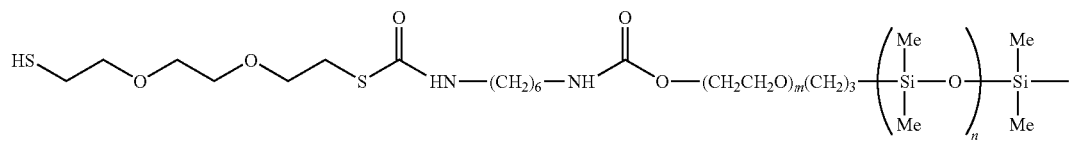
5
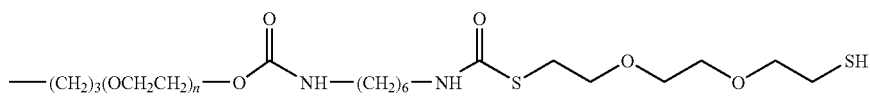
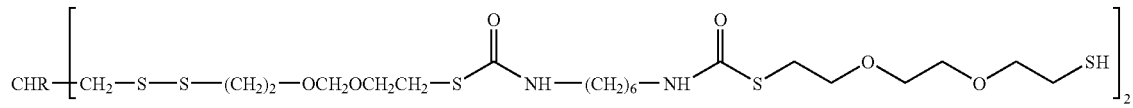
6
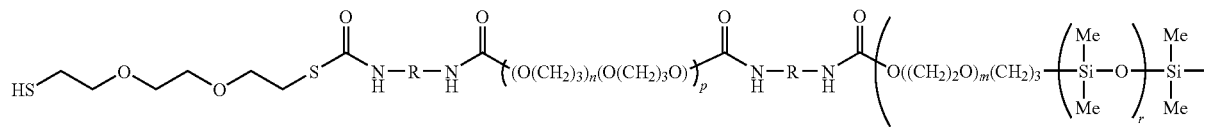
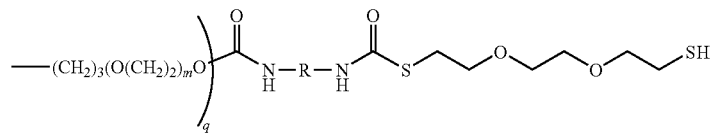
X = O, N, S
Structures 7-13 below are examples of A-B-A Block copolymers that are hydroxyl or amine functional. These structures can be used in combination with Adducts 1-6 or can be used as precursors to form Adducts 14-20. Of course structures can be used in combination with Adducts 14-20 as well.

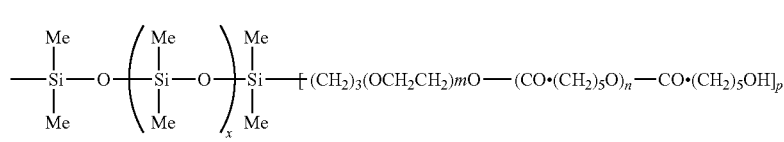
7
where x is 0-40, m is 0-1, n is 1-50, and p is 1-4.
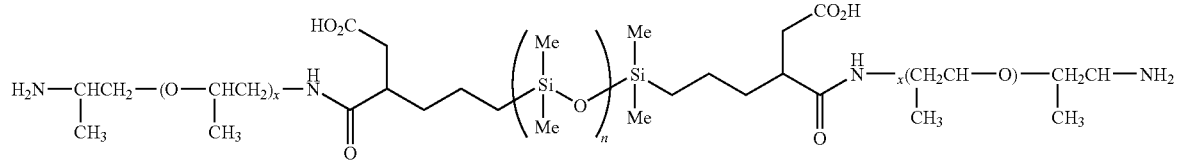
8
where n is 0-40 and x is 2-50.
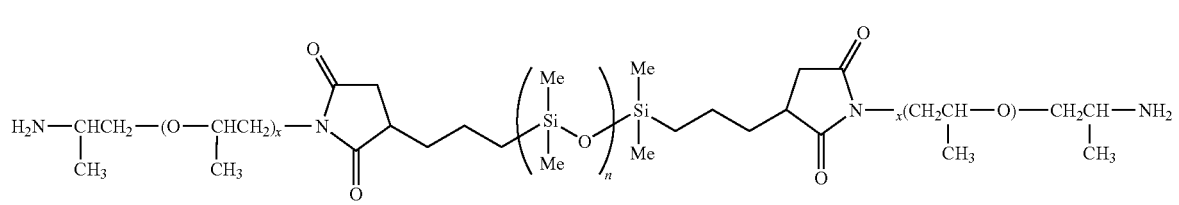
9
where n is 1-40 and X is 2-50.
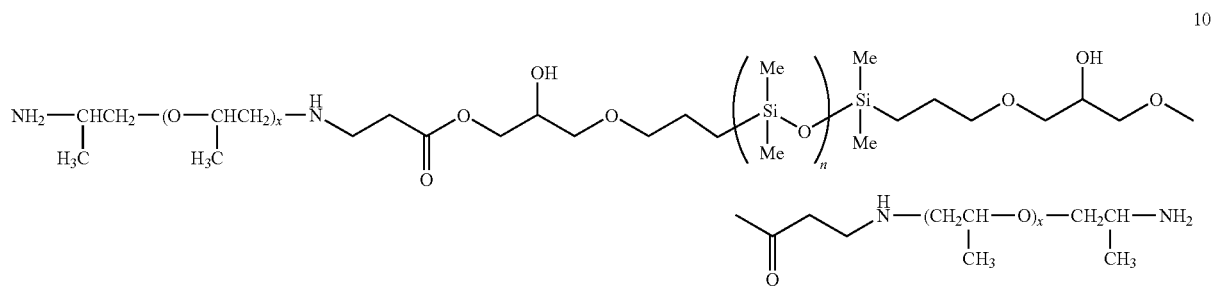
10
where n is 1-40 and X is 2-50.
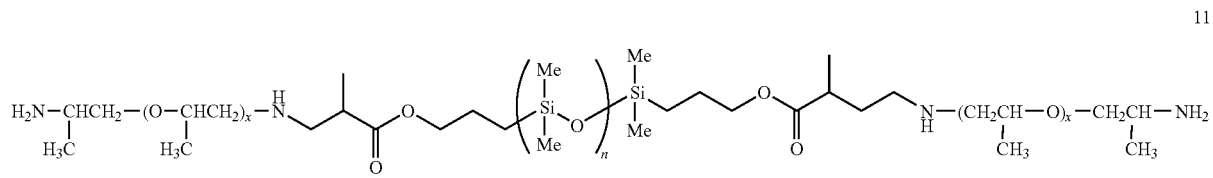
11
where n is 1-40 and X is 2-50.

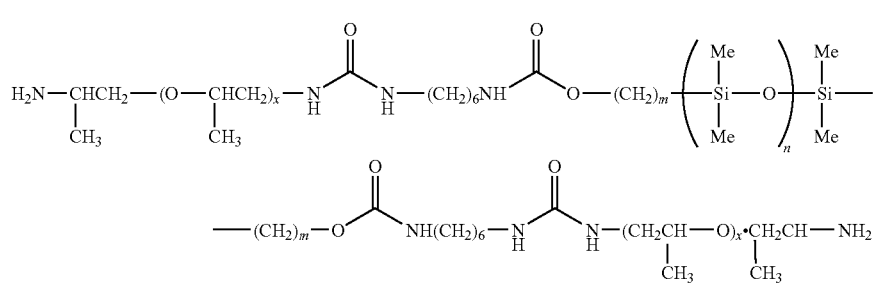

where n is 1-40 and X is 2-50.

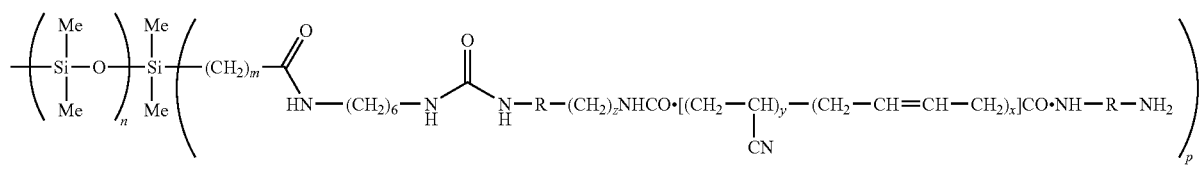

where n is 1-40, m is 3-10, X is 0-10, Y is 0-10, Z is 0-2, R is an alkyl or a cycloalkyl radical and p is 1-4.

Or, in each of structures 7-13, the terminal hydroxyl/amine groups may be reacted with an isocyanate-containing compound and thereafter with a polythiol such as, for example, 3,6-dioxa-1,8-octane dithiol to form a thiol-functionalized adduct, as shown below in Adducts 14-20.

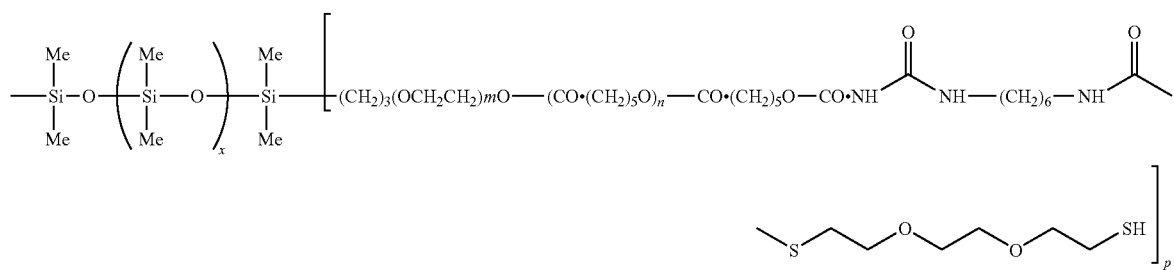

where x is 0-40, m is 0-1, n is 1-50 and p is 1-4.

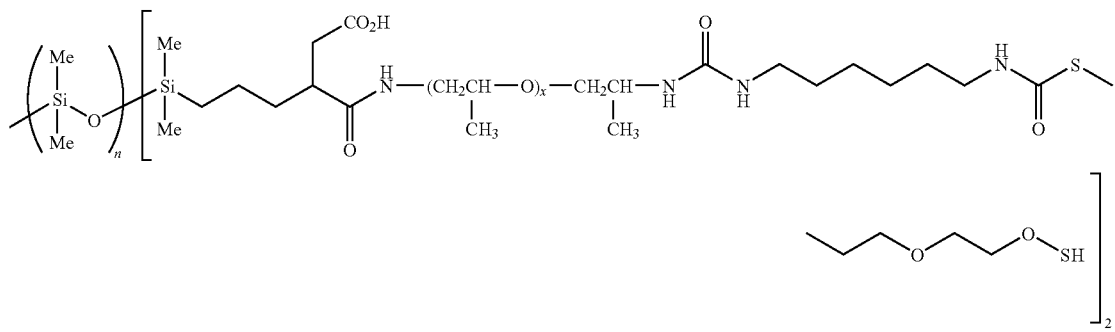

where n is 1-40 and x is 2-50.

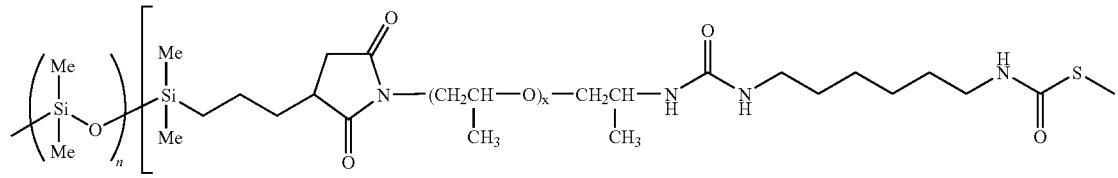
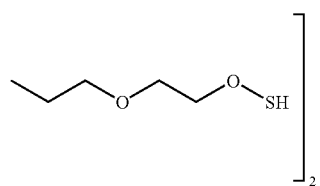
where n is 1-40 and x is 2-50.
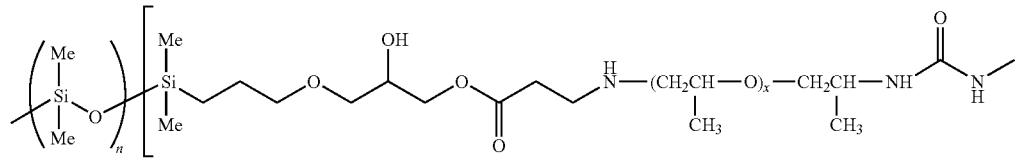
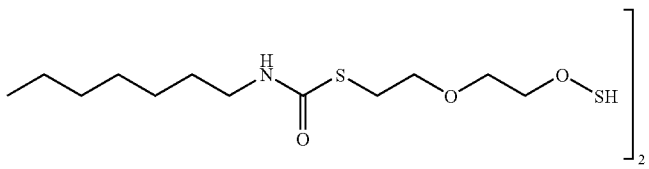
where n is 1-40 and x is 2-50.
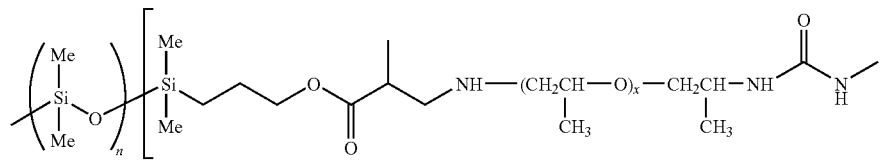
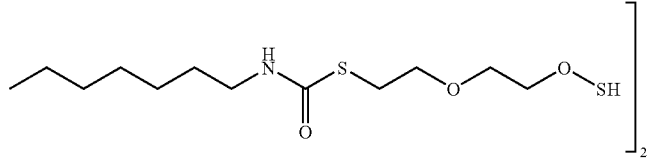
where n is 1-40 and x is 2-50.

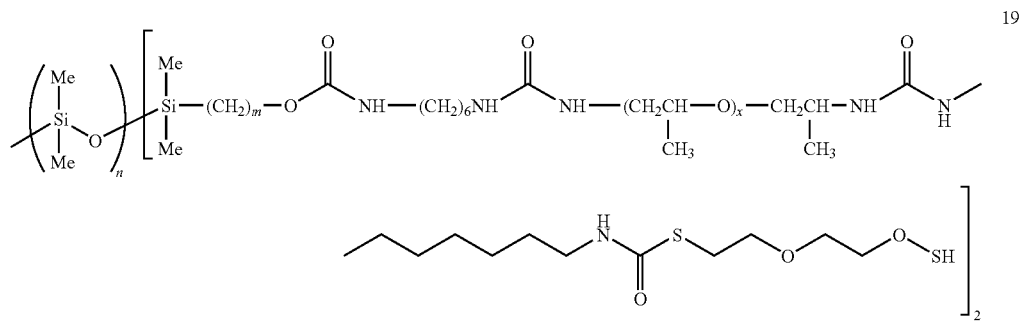

19 where n is 1-40 and x is 2-50.

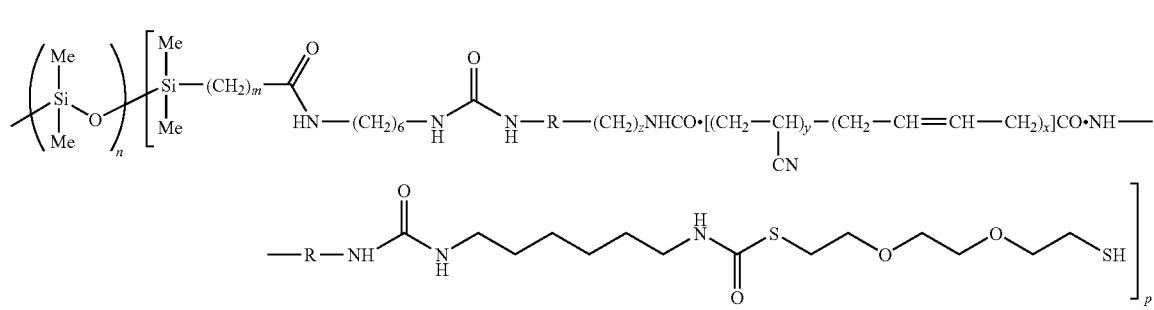

20 where n is 1-40, m is 3-10, X is 0-10, Y is 0-10, Z is 0-2, R is an alkyl or a cycloalkyl radical and p is 1-4.

As noted above, the thermosetting resin formulations include as a thermosetting resin one or more of an epoxy, an episulfide and a benzoxazine. Representative epoxy monomers contemplated for use herein the preparation of invention toughening agents include bisphenol F diglycidyl ether, bisphenol A diglycidyl ether, 4-vinyl-1-cyclohexene diepoxide, butanediol diglycidyl ether, neopentylglycol diglycidyl ether, 3,4-epoxycyclohexylmethyl-3,4-epoxycyclohexanecarboxylate, limonene diepoxide, hexanediol diglycidyl ether, trimethylolpropane triglycidyl ether, aniline diglycidyl ether, diglycidyl ether of propylene glycol, cyanuric acid triglycidyl ether, ortho-phthalic acid diglycidyl ether, diglycidyl ester of linoleic dimer acid, dicyclopentadiene diepoxide, diglycidyl ether of tetrachloro bisphenol A, 1,1,1-tris (p-hydroxyphenyl)ethane glycidyl ether, tetra glycidyl ether of tetrskis(4-hydroxyphenyl)ethane, epoxy phenol novolac resins, epoxy cresol novolac resins, tetraglycidyl-4,4'-diaminodiphenylmethane, and the like.

Among the commercially available epoxy resins suitable for use herein are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals, Tarrytown, N.Y.; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba Specialty Chemicals. SU-8 is a bisphenol A-type epoxy novolac available from Resolution. Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE MY-721, ARALDITE 0500, and ARALDITE 0510 from Ciba Specialty Chemicals and PGA-X and PGA-C from the Sherwin-Williams Co. And of course combinations of the different epoxy resins are also desirable for use herein.

Representative episulfide monomers for use herein are the thiirane counterparts to the epoxy monomers noted in the preceding paragraphs.

Representative benzoxazine monomers for use herein include those embraced by the following structure:

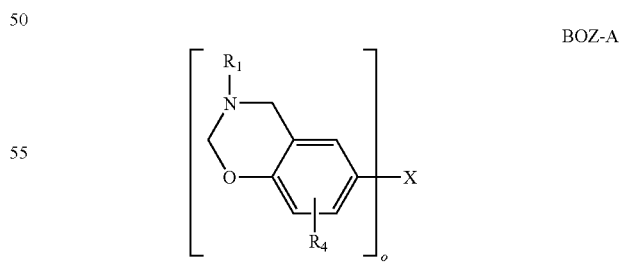

BOZ-A where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from hydrogen, alkyl, alkenyl and aryl, and $R_4$ is selected from hydrogen, halogen, alkyl and alkenyl.

Alternatively, the benzoxazine may be embraced by the following structure:

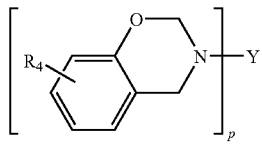

BOZ-B where p is 2, Y is selected from biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from hydrogen, halogen, alkyl and alkenyl.

More specifically, within structure BOZ-A the benzoxazine may be embraced by the following structure BOZ-C:

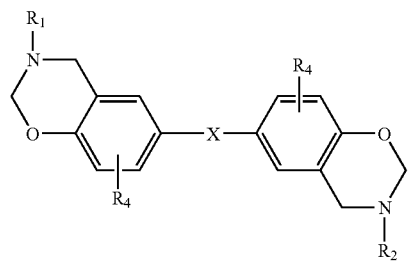

BOZ-C where X is selected from a direct bond, $CH_2$, $C(CH_3)_2$, $C=O$, S, $S=O$ and $O=S=O$, $R_1$ and $R_2$ are the same or different and are selected from hydrogen, alkyl, such as methyl, ethyl, propyls and butyls, alkenyl, such as allyl, and aryl and $R_4$ are the same or different and are selected from hydrogen or alkenyl, such as allyl.

Representative benzoxazines within structure BOZ-C include:

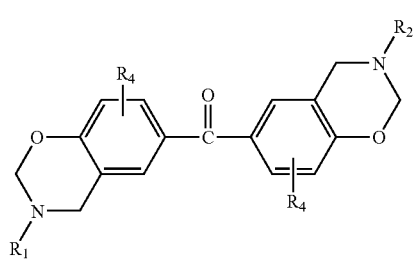

BOZ-D

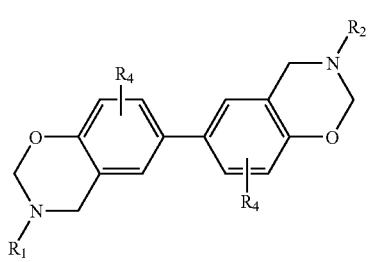

BOZ-E

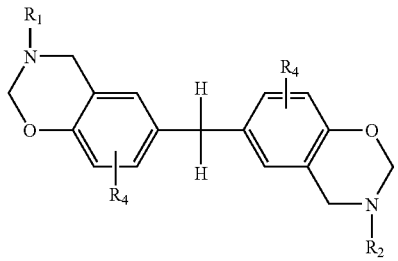

BOZ-F

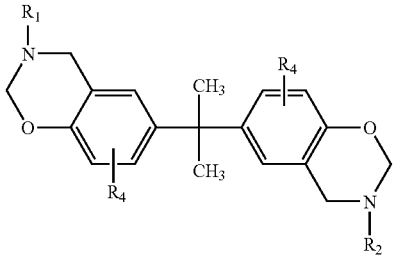

BOZ-G where $R_1$, $R_2$ and $R_4$ are as defined above.

Though not embraced by benzoxazine structures BOZ-A or BOZ-B, additional benzoxazines are within the following structures:

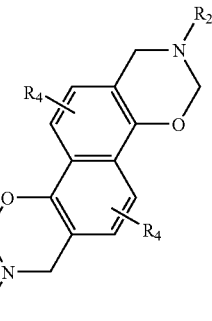

BOZ-H

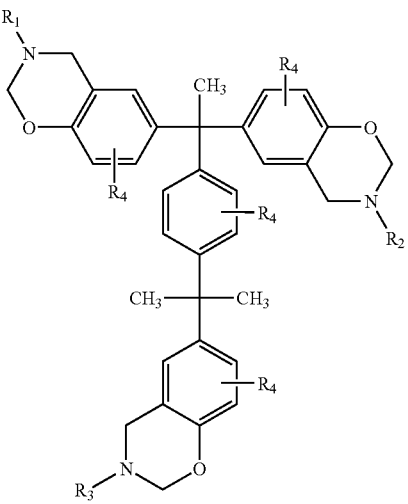

BOZ-I

-continued
BOZ-J
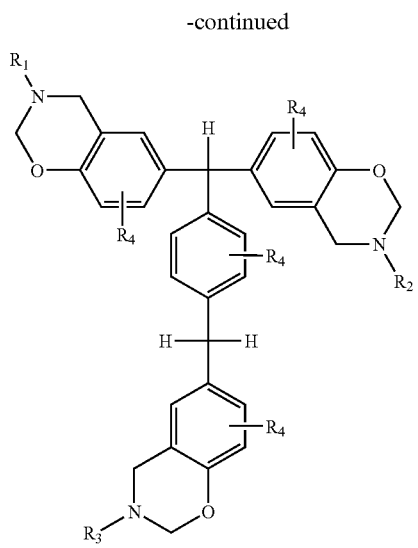
where $R_1$, $R_2$ and $R_4$ are as defined above, and $R_3$ is defined as $R_1$ $R_2$ or $R_4$.
Specific examples of these benzoxazines include:
BOZ-K
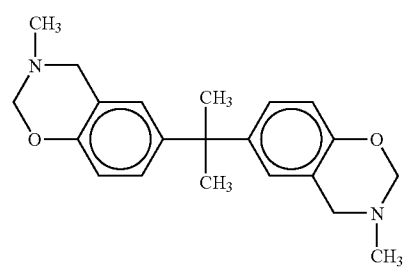
BOZ-L
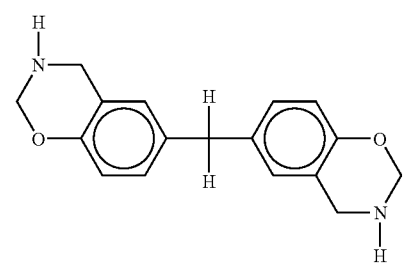
BOZ-M
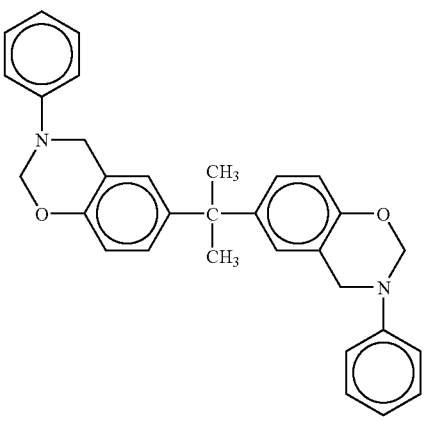
-continued
BOZ-N
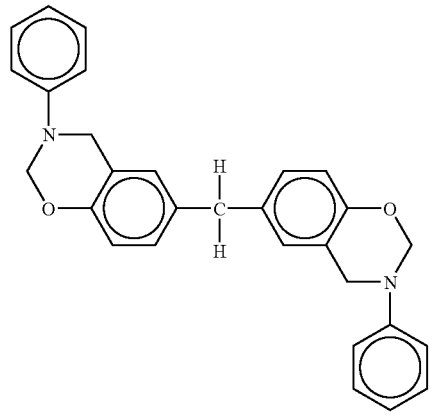
BOZ-O
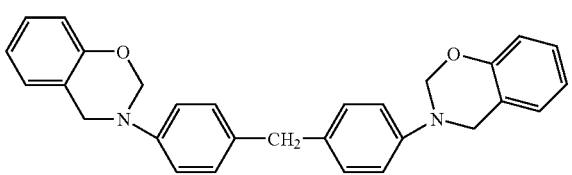
BOZ-P
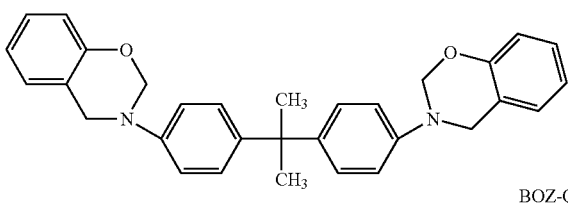
BOZ-Q
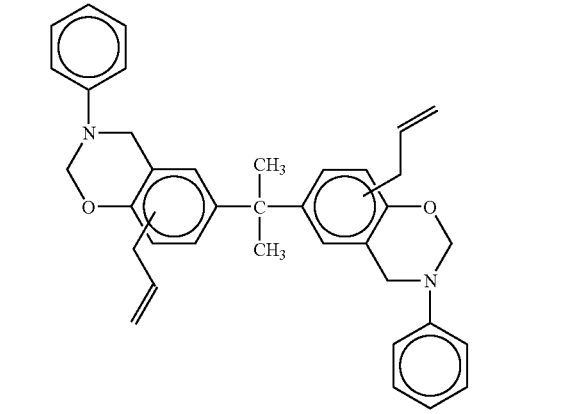
BOZ-R
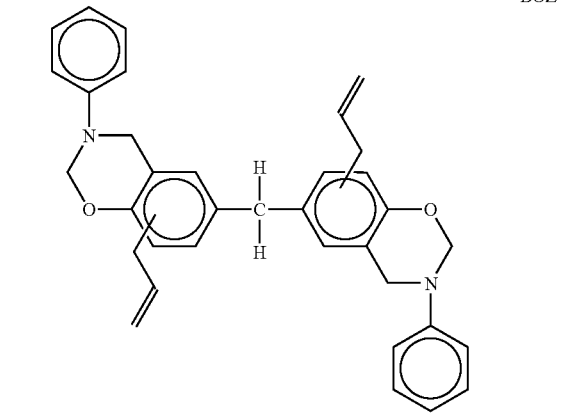

The benzoxazine component may include the combination of multifunctional benzoxazines and monofunctional benzoxazines, or may be the combination of one or more multifunctional benzoxazines or one or more monofunctional benzoxazines.

Examples of monofunctional benzoxazines may be embraced by the following structure:

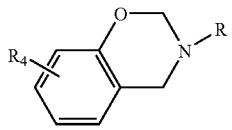

BOZ-S where R is alkyl, such as methyl, ethyl, propyls and butyls, or aryl with or without substitution on one, some or all of the available substitutable sites, and $R_4$ is selected from hydrogen, halogen, alkyl and alkenyl.

For instance, monofunctional benzoxazines may be embraced by the structure

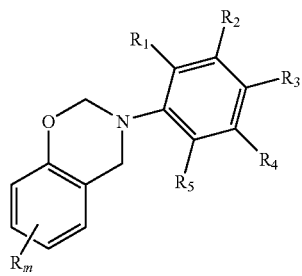

BOZ-T where in this case R is selected from alkyl, alkenyl, each of which being optionally substituted or interrupted by one or more O, N, S, C=O, COO, and NHC=O, and aryl; m is 0-4; and $R_1$-$R_5$ are independently selected from hydrogen, alkyl, alkenyl, each of which being optionally substituted or interrupted by one or more O, N, S, C=O, COOH, and NHC=O, and aryl.

Specific examples of such a monofunctional benzoxazine are:

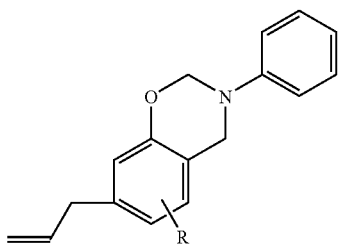

BOZ-U where R is as defined above; or

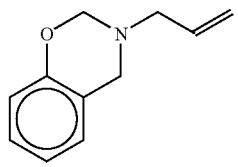

BOZ-V

Many benzoxazines are presently available commercially from several sources, including Hexcion; Georgia-Pacific Resins, Inc.; and Shikoku Chemicals Corporation, Chiba, Japan, the last of which offers among others B-a, B-m, F-a, C-a, Pd and F-a benzoxazine resins.

If desired, however, instead of using commercially available sources, the benzoxazine may typically be prepared by reacting a phenolic compound, such as a bisphenol A, bisphenol F, bisphenol S or thiodiphenol, with an aldehyde and an alkyl or aryl amine. U.S. Pat. No. 5,543,516, hereby expressly incorporated herein by reference, describes a method of forming benzoxazines, where the reaction time can vary from a few minutes to a few hours, depending on reactant concentration, reactivity and temperature. See also Burke et al., *J. Org. Chem.*, 30(10), 3423 (1965); see generally U.S. Pat. Nos. (Schreiber), 5,021,484 (Schreiber), 5,200,452 (Schreiber) and 5,443,911 (Schreiber).

Benzoxazine polymerization can be self-initiated under elevated temperature conditions and also by inclusion of cationic initiators, such as Lewis acids, and other known cationic initiators, such as metal halides; organometallic derivatives; metallophorphyrin compounds such as aluminum phthalocyanine chloride; methyl tosylate, methyl triflate, and triflic acid; and oxyhalides. Likewise, basic materials, such as imidizaoles, may be used to initiate polymerization.

The epoxy, episulfide and/or benzoxazine should be present in the inventive composition in an amount in the range of about 10 to about 90 percent by weight, such as about 25 to about 75 percent by weight, desirably about 35 to about 65 percent by weight, based on the total weight of the composition.

As noted above, the composition may include as the thermoset component any epoxy, episulfide or benzoxazine, at least a portion of which is a multifunctional monomer. Ordinarily, the multifunctional monomer used in the composition should be included in amount within the range of about 20 weight percent to about 100 weight percent of the composition.

A monofunctional monomer, if present, should ordinarily be used as a reactive diluent, or crosslink density modifier. In the event such a monofunctional monomer is included as a portion of the composition, such resin should be employed in an amount of up to about 20 weight percent, based on the composition.

Typically, the composition including the inventive adduct have about 40 to about 95 weight percent of the thermoset component, about 5 to about 50 weight percent of the inventive adduct, and about 0.2 to about 10 weight percent of the curative.

As employed herein, the term "curing agent" or "curative" refers to polymerization promoters, co-curing agents, catalysts, initiators or other additives designed to participate in or promote curing of the thermosetting resin formulation. With respect to epoxy containing thermosetting resin formulations, such curing agents include polymerization promoters and catalysts such as, for example, anhydrides, amines, imidazoles, amides, thiols, carboxylic acids, phenols, dicyandiamide, urea, hydrazine, hydrazide, amino-formaldehyde resins, melamine-formaldehyde resins, amine-boron trihalide complexes, quaternary ammonium salts, quaternary phosphonium salts, tri-aryl sulfonium salts, di-aryl iodonium salts, diazonium salts, and the like, as well as combinations of any two or more thereof, optionally also including a transition metal complex. Presently preferred curing agents and catalysts for epoxy composition include anhydrides, amines, imidazoles, and the like.

As readily recognized by those of skill in the art, curing agents contemplated for use in the practice of the present invention will vary with the reactive functionality(ies)

present, the presence of optional co-reactant(s), and the like. Typically, the quantity of curing agent will fall in the range of about 1 weight percent up to about 50 weight percent of the composition, with presently preferred amounts of curing agent falling in the range of about 5 weight percent up to about 40 weight percent of the composition.

Initiators include hydroxy functionalized compounds such as, for example, alkylene glycols. Preferred alkylene glycols include ethylene glycols and propylene glycols.

Fillers contemplated for optional use in the practice of the present invention include, for example, aluminum nitride, boron nitride, silicon carbide, diamond, graphite, beryllium oxide, magnesia, silicas, such as fumed silica or fused silica, alumina, perfluorinated hydrocarbon polymers (i.e., TEFLON), thermoplastic polymers, thermoplastic elastomers, mica, glass powder and the like. Preferably, the particle size of these fillers will be about 20 microns. If aluminum nitride is used as a filler, it is preferred that it be passivated via an adherent, conformal coating (e.g., silica, or the like). Some of those fillers may impart properties to the adhesive formulation such as, for example, reduced thermal expansion of the cured adhesive, reduced dielectric constant, improved toughness, increased hydrophobicity, and the like.

Flexibilizers (also called plasticizers) contemplated for optional use in the practice of the present invention include branched polyalkanes or polysiloxanes that lower the $T_g$ of the formulation. Such flexibilizers include, for example, polyethers, polyesters, polythiols, polysulfides, and the like. If used, flexibilizers typically are present in the range of about 0.5 weight percent up to about 30 weight percent of the composition.

Dyes and/or pigments may be used in the practice of the present invention. When present, such dyes and pigments are typically present in the range of about 0.5 weight percent up to about 5 weight percent based on the composition.

Rubber particles, especially rubber particles that have relatively small average particle size (e.g., less than about 500 nm or less than about 200 nm), may also be included in the compositions of the present invention. The rubber particles may or may not have a shell common to known core-shell structures.

In the case of rubber particles having a core-shell structure, such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane).

The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., tonically or covalently). The shell may be grafted onto the core. The polymer comprising the shell may bear one or more different types of functional groups (e.g., epoxy groups) that are capable of interacting with other components of the compositions of the present invention.

Typically, the core will comprise from about 50 to about 95 weight percent of the rubber particles while the shell will comprise from about 5 to about 50 weight percent of the rubber particles.

Preferably, the rubber particles are relatively small in size. For example, the average particle size may be from about 0.03 to about 2 microns or from about 0.05 to about 1 micron. The rubber particles may have an average diameter of less than about 500 nm, such as less than about 200 nm. For example, the core-shell rubber particles may have an average diameter within the range of from about 25 to about 200 nm.

Methods of preparing rubber particles having a core-shell structure are well-known in the art and are described, for example, in U.S. Pat. Nos. 4,419,496, 4,778,851, 5,981,659, 6,111,015, 6,147,142 and 6,180,693, each of which being incorporated herein by reference in its entirety.

Rubber particles having a core-shell structure may be prepared as a masterbatch where the rubber particles are dispersed in one or more epoxy resins such as a diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in International Patent Publication No. WO 2004/108825, incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch.

Particularly suitable dispersions of rubber particles having a core-shell structure in an epoxy resin matrix are available from Kaneka Corporation.

For instance, the core may be formed predominantly from feed stocks of polybutadiene, polyacrylate, polybutadiene/acrylonitrile mixture, polyols and/or polysiloxanes or any other monomers that give a low glass transition temperature. The outer shells may be formed predominantly from feed stocks of polymethylmethacrylate, polystyrene or polyvinyl chloride or any other monomers that give a higher glass transition temperature.

The core shell rubbers may have a particle size in the range of 0.07 to 10 um, such as 0.1 to 5 um.

The core shell rubber made in this way are may be dispersed in an epoxy matrix or a phenolic matrix. Examples of epoxy matrices include the diglycidyl ethers of bisphenol A, F or S, or biphenol, novalac epoxies, and cycloaliphatic epoxies. Examples of phenolic resins include bisphenol-A based phenoxies.

The core shell rubber dispersion may be present in the epoxy or phenolic matrix in an amount in the range of about 5 to about 50% by weight, with about 15 to about 25% by weight being desirable based on viscosity considerations.

When used in the inventive compositions, these core shell rubbers allow for toughening to occur in the composition and oftentimes in a predictable manner—in terms of temperature neutrality toward cure—because of the substantial uniform dispersion, which is ordinarily observed in the core shell rubbers as they are offered for sale commercially.

Many of the core-shell rubber structures available from Kaneka are believed to have a core made from a copolymer of (meth)acrylate-butadiene-styrene, where the butadiene is the primary component in the phase separated particles, dispersed in epoxy resins. Other commercially available masterbatches of core-shell rubber particles dispersed in epoxy resins include GENIOPERL M23A (a dispersion of 30 weight percent core-shell particles in an aromatic epoxy resin based-on bisphenol A diglycidyl ether; the core-shell particles have an average diameter of ca. 100 nm and contain a crosslinked silicone elastomer core onto which an epoxy-functional acrylate copolymer has been grafted; the silicone elastomer core represents about 65 weight percent of the core-shell particle), available from Wacker Chemie GmbH.

In the case of those rubber particles that do not have such a shell, the rubber particles may be based on the core of such structures.

Preferably, the rubber particles are relatively small in size. For example, the average particle size may be from about 0.03 to about 2 μm or from about 0.05 to about 1 μm. In certain embodiments of the invention, the rubber particles have an average diameter of less than about 500 nm. In other embodiments, the average particle size is less than about 200 nm. For example, the rubber particles may have an average diameter within the range of from about 25 to about 200 nm or from about 50 to about 150 nm.

The rubber particles generally are comprised of a polymeric material having elastomeric or rubbery properties (i.e., a glass transition temperature less than about 0° C., e.g., less than about −30° C.). For example, the rubber particles may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) and polysiloxanes. The rubber particles may contain functional groups such as carboxylate groups, hydroxyl groups or the like and may have a linear, branched, crosslinked, random copolymer or block copolymer structure.

For instance, the rubber particles may be formed predominantly from feed stocks of dienes such as butadiene, (meth) acrylates, ethylenically unsaturated nitriles such as acrylonitrile, and/or any other monomers that when polymerized or copolymerized yield a polymer or copolymer having a low glass transition temperature.

The rubber particles may be used in a dry form or may be dispersed in a matrix, such as an epoxy matrix or a phenolic matrix. The matrix material preferably is liquid at room temperature. Examples of epoxy matrices include the diglycidyl ethers of bisphenol A, F or S, or bisphenol, novalac epoxies, and cycloaliphatic epoxies. Examples of phenolic resins include bisphenol-A based phenoxies.

The rubber particles may be present in the epoxy or phenolic matrix in an amount in the range of about 5 to about 50 weight percent and as about 15 to about 40 weight percent.

Typically, the composition may contain in the range of about 5 to about 35 weight percent, and as about 15 to about 30 weight percent rubber particles.

Combinations of different rubber particles may advantageously be used in the present invention. The rubber particles may differ, for example, in particle size, the glass transition temperatures of their respective materials, whether, to what extent and by what the materials are functionalized, and whether and how their surfaces are treated.

A portion of the rubber particles may be supplied to the adhesive composition in the form of a masterbatch, where the particles are stably dispersed in an epoxy resin matrix and another portion may be supplied to the adhesive composition in the form of a dry powder (i.e., without any epoxy resin or other matrix material). For example, the adhesive composition may be prepared using both a first type of rubber particles in dry powder form having an average particle diameter of from about 0.1 to about 0.5μ and a second type of rubber particles stably dispersed in a matrix of liquid bisphenol A diglycidyl ether at a concentration of from about 5 to about 50 percent by weight having an average particle diameter of from about 25 to about 200 nm. The weight ratio of first type:second type rubber particles may be from about 1.5:1 to about 0.3:1, for example.

The chemical composition of the rubber particles may be essentially uniform throughout each particle. However, the outer surface of the particle may be modified by reaction with a coupling agent, oxidizing agent or the like so as to enhance the ability to disperse the rubber particles in the adhesive composition (e.g., reduce agglomeration of the rubber particles, reduce the tendency of the rubber particles to settle out of the adhesive composition). Modification of the rubber particle surface may also enhance the adhesion of the epoxy resin matrix to the rubber particles when the adhesive is cured. The rubber particles may alternatively be irradiated so as to change the extent of crosslinking of the polymer(s) constituting the rubber particles in different regions of the particle. For example, the rubber particles may be treated with gamma radiation such that the rubber is more highly crosslinked near the surface of the particle than in the center of the particle.

Rubber particles that are suitable for use in the present invention are available from commercial sources. For example, rubber particles supplied by Eliokem, Inc. may be used, such as NEP R0401 and NEP R401S (both based on acrylonitrile/butadiene copolymer); NEP R0501 (based on carboxylated acrylonitrile/butadiene copolymer; CAS No. 9010-81-5); NEP R0601A (based on hydroxy-terminated polydimethylsiloxane; CAS No. 70131-67-8); and NEP R0701 and NEP 0701S (based on butadiene/styrene/2-vinylpyridine copolymer; CAS No. 25053-48-9).

Rubber particles that have been treated with a reactive gas or other reagent to modify the outer surfaces of the particles by, for instance, creating polar groups (e.g., hydroxyl groups, carboxylic acid groups) on the particle surface, are also suitable for use in the present invention. Illustrative reactive gases include, for example, ozone, $Cl_2$, $F_2$, $O_2$, $SO_3$, and oxidative gases. Methods of surface modifying rubber particles using such reagents are known in the art and are described, for example, in U.S. Pat. Nos. 5,382,635; 5,506,283; 5,693,714; and 5,969,053, each of which is incorporated herein by reference in its entirety. Suitable surface modified rubber particles are also available from commercial sources, such as the rubbers sold under the tradename VISTAMER by Exousia Corporation.

Where the rubber particles are initially provided in dry form, it may be advantageous to ensure that such particles are well dispersed in the adhesive composition prior to curing the adhesive composition. That is, agglomerates of the rubber particles are preferably broken up so as to provide discrete individual rubber particles, which may be accomplished by intimate and thorough mixing of the dry rubber particles with other components of the adhesive composition. For example, dry rubber particles may be blended with epoxy resin and milled or melt compounded for a length of time effective to essentially completely disperse the rubber particles and break up any agglomerations of the rubber particles.

Solid organic acids are useful in the thermosetting resin formulation to improve viscosity stability. These solid organic acids include compounds having acid functional groups, as well as compounds which have an acidic proton or have an acid nature, for example enolisable materials.

The term "aliphatic" as used in connection with the solid organic acid refers to $C_1$-$C_{40}$, suitably $C_1$-$C_{30}$ straight or branched chain alkenyl, alkyl, or alkynyl which may or may not be interrupted or substituted by one or more heteroatoms such as O, N or S.

The term "cycloaliphatic" as used herein refers to cyclised aliphatic $C_3$-$C_{30}$, suitably $C_3$-$C_{20}$ groups and includes those interrupted by one or more heteroatoms such as O, N, or S.

The term "aromatic" refers to $C_3$-$C_{40}$ suitably $C_3$-$C_{30}$ aromatic groups including heterocyclic aromatic groups containing one or more of the heteroatoms, O, N, or S, and fused ring systems containing one or more of these aromatic groups fused together.

The term "carboxylic acid" includes acids having one or more carboxylic groups, and if two or more are present, one or more may be optionally esterified, the ester group suitably comprising a $C_1$-$C_{10}$ alkyl group suitably a $C_1$-$C_4$ alkyl group.

The term "quinone" includes compounds having one or more quinone groups and the terms aliphatic, cycloaliphatic and aromatic when used to describe quinones are used to refer to quinones to which aliphatic, cycloaliphatic and aromatic groups or combinations of these groups are attached by direct bonding or ring fusion.

The term "phenol" includes compounds having one or more phenolic groups and the terms aliphatic, cycloaliphatic and aromatic when used to describe phenols is used to refer to phenols to which aliphatic, cycloaliphatic and aromatic groups or combinations of these groups are attached by direct bonding or ring fusion.

The term "enolisable" includes compounds having one or more enolisable functional groups.

The term "derivatives" refers to substitutions at one ore more positions (including directly on a heteroatom) with one or more of the following:

$C_1$-$C_{20}$ alkoxy, $C_1$-$C_{20}$ alkyl, $C_2$-$C_{20}$ alkenyl, a carbonyl group, a thiocarbonyl group such as a —C=S group, a carboxylic group, a $C_1$-$C_4$ alkyl group further containing up to three N atoms, phenyl, $C_1$-$C_4$ alkylphenyl, or $C_2$-$C_4$ alkenylphenyl; OR, NR, SR, or SSR, where R is phenyl, an aliphatic, cycloaliphatic or aromatic group, each of which may be optionally further substituted in any position with one or more, of $C_1$-$C_4$ alkyl, OH, halogen (F, Br, Cl, or I), phenyl, a $C_1$-$C_4$ alkylphenyl, a $C_2$-$C_4$ alkenylphenyl, or OR, where R is phenyl, a carboxylic group, carbonyl, or an aromatic group and R is optionally substituted with $C_1$-$C_4$ alkyl, OH, or halogen; or nitro, nitrile, or halogen.

Examples of useful solid organic acids are phenols, quinones, carboxylic acids and enolisable materials. An example of an enolisable material is barbituric acid. The term "acid" includes polymeric acids including polycarboxylic acids and polyphenols.

The solid organic acids should be substantially insoluble in the thermosetting resin formulation at temperatures in the range of about 5° C. to about 35° C., such as about 15° C. to about 30° C.

The solid organic acid should be present in an amount of about 0.1 to 25 parts by weight per 100 parts of the thermosetting resin in the thermosetting resin formulation.

The solid organic acid should have a degree of insolubility such that it can act as a reservoir permitting only sufficient acid to solubilise thereby neutralising any soluble curative and/or a reaction product of the thiol-capped adduct and the curative. The solid organic acid which is substantially insoluble, remains so in effective amounts at temperatures below the elevated activation temperatures necessary to initiate cure of the composition. The temperatures below the activation temperature referred to include temperatures at or about room temperature. In other words, an amount of the solid organic acid remains in the solid form, the amount being effective to stabilise the composition. Thus cure initiating species present in the composition are neutralised by the solubilised acid, on a continuing basis. Of course, depending on the particular acid and hardener the stabilisation time may vary. Those skilled in the art will readily understand how to vary that time as desired by making appropriate choices of the particular components and using suitable amounts thereof.

The solid organic acids should have a pKa less than the pKa of the thiol-capped adduct. Typically, the thiol-capped adducts have pKas within the range of about 8-12. Desirable acids are those having a pKa less than or equal to about 12.0, desirably less than or equal to about 10.0, and often less than or equal to about 9.0, such as less than or equal to about 7.5. Where a combination of two or more solid organic acids is used the pKa of the combination should be less than or equal to about 12.0. Ordinarily, at least one of the acids in the solid organic acid component has a pKa less than that of the thiol-capped adduct, i.e. less than or equal to about 12.0, and suitably less than or equal to about 10.0 and often less than or equal to about 9.0 such as less than or equal to about 7.5.

When present, the solid organic acid may react preferentially with the soluble latent hardener until the acid concentration has been exhausted, at which time the latent hardener may react with the thiol-capped adduct in the thermosetting resin formulation to commence cure of the composition. The solid organic acid component remains substantially insoluble in the composition so that solid organic acid is present in an amount effective to stabilise the Theological properties of the composition. Some Theological stabilisation may be imparted by the neutralisation of the soluble latent hardener by the solid organic acid.

The solid organic acid desirably has a mean particle size in the range about 0.1 to about 500 microns suitably about 5 to about 100 microns, and desirably about 10 to about 50 microns.

The solid organic acid may be selected from carboxylic acids of the general formula: $R_1CO_2H$, where $R_1$ is trans-CH=CHCO$_2$H, —CH=CHCO$_2$R [where R is CH$_3$], —CH$_2$C(OR')(CO$_2$R")CH$_2$CO$_2$R''' [where R' is H, $C_1$-$C_{10}$ alkyl, or Ar; R" is H, $C_1$-$C_{10}$ alkyl, or Ar; R''' is H, $C_1$-$C_{10}$ alkyl, or Ar], $C_{11}$-$C_{18}$ alkyl, —(CH$_2$)$_n$CO$_2$H [n is 1-9], —(CHR)$_n$CO$_2$H [R is H or OH, n is 1 or 2], —CH(OR')R" [R' is H, alkyl, R"=C$_1$-C$_{10}$ alkyl, or Ph], —CH=CH—Ar, or

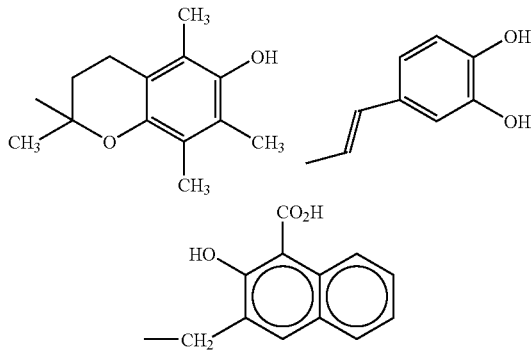

Other suitable solid organic acids are benzoic acids of the general formula:

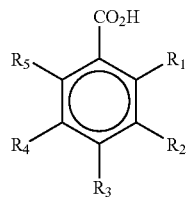

where R$_1$ is H, alkyl, haloalkyl such as CX$_3$ [where X is F, Cl, Br, or I], alkenyl, OH, OR [where R is alkyl, Ph, Bn, or Ar], —S—S—Ar—CO$_2$H, —S—S—Ar, —SR (where R is H, alkyl, haloalkyl, Ph, Bn, or Ar), Ph, Bn, Ar, CO$_2$R [where R is H, alkyl, Ph, Bn, or Ar], C(=O) R [where R is H, alkyl, Ph, Bn, or Ar], or NO$_2$; R$_2$ is H, alkyl, haloalkyl such as CX$_3$ [where X is F, Cl, Br, or I], alkenyl, Ph, Bn, Ar, OH, OR [where R is alkyl, Ph, Bn, or Ar], —CH$_2$Ar, NO$_2$, C(=O)R [where R is C$_1$-C$_{10}$ alkyl, Ph, Bn, or Ar], CHO, CO$_2$R [where R is H, alkyl, haloalkyl, Ph, Bn, or Ar], or R$_3$ is H, alkyl, haloalkyl such as CX$_3$ [where X is F, Cl, Br, or I], alkenyl, OH, OR [where R is alkyl, Ph, Bn, or Ar], Ph, Bn, Ar, alkyl, CHO, C(=O)R [where R is alkyl, Ph, Bn, or Ar], CO$_2$R [where R is H, alkyl, Ph, Bn, or Ar] or NO$_2$; R$_4$ is H, alkyl, haloalkyl such as CX$_3$ [where X is F, Cl, Br, or I], alkenyl, OH, OR [where R is alkyl, Ph, Bn, or Ar], NO$_2$, C(=O)R [where R is alkyl, Ph, Bn, or Ar], CHO, CO$_2$R [where R is H, alkyl, Ph, Bn, or Ar], Ph, Bn, or Ar; R$_5$ is H, alkyl, haloalkyl such as CX$_3$ [where X is F, Cl, Br, or I], alkenyl, OH, OR [where R is alkyl, Ph, Bn, or Ar], Ph, Bn, Ar, CHO, C(=O)R [where R is alkyl, Ph, Bn, or Ar], CO$_2$R [where R is H, alkyl, Ph, Bn, or Ar], or NO$_2$.

Quinones of the general formula below are also suitable for use herein.

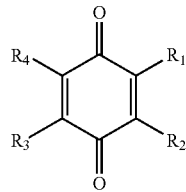

where R$_1$, R$_2$, R$_3$ and R$_4$ are independently H, alkyl, haloalkyl, alkenyl, OR[R is H, alkyl, Ar, Ph, or Bn] CN, Ph, or Ar.

Phenols of the general formula below are also suitable for use herein.

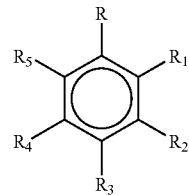

where R is H or OH; R$_1$ is H, alkyl, haloalkyl such as CX$_3$ [where X is F, Br, Cl, or I], alkenyl, Cl, F, Br, I, CN, OH, OR [where R is alkyl, Ph, Bn, or Ar], NO$_2$, C(=O)R [where R is alkyl, Ph, Bn, or Ar], CHO, CO$_2$R [where R is H, alkyl, Ph, Bn, or Ar], or PhOH; R$_2$ is H, alkyl, haloalkyl, alkenyl, OH, OR [where R is alkyl, Ph, Bn, or Ar], Ph, Bn, —CH$_2$Ar, CN, F, Cl, Br, or I; R$_3$ is H, alkyl, haloalkyl such as CX$_3$ [where X is F, Br, Cl, or I], alkenyl, NO$_2$, C(=O)R [where R is alkyl, Ph, Bn, or Ar], CHO, CO$_2$R [where R is alkyl, Ph, Bn, or Ar], OH, OR [where R is alkyl, Ph, Bn, or Ar], Ar, Bn, Ph, C(R)$_2$PhOH [where R is Me or H], C(R)$_2$Ar [where R is Me or H] or

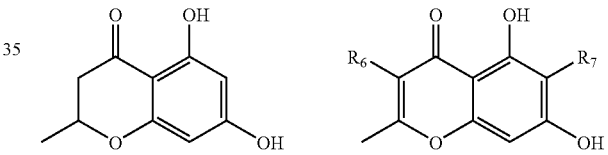

where R$_6$ and R$_7$ are independently H, alkyl, haloalkyl, alkenyl, OH, or OR [where R is alkyl, Ph, Bn, or Ar]; R$_4$ is H, alkyl, haloalkyl, alkenyl, OH, OR [where R is alkyl, Ph, Bn, or Ar], F, Cl, Br, I, CN, Ph, Bn, or —CH$_2$Ar; R$_5$ is H, alkyl, haloalkyl such as CX$_3$ [where X is F, Br, Cl, or I], alkenyl, F, Cl, Br, I, CN, OH, OR [R is alkyl, Ph, Bn, or Ar], NO$_2$, C(=O)R [where R is alkyl, Ph, Bn, or Ar], CHO, CO$_2$R [where R is H, alkyl, Ph, Bn, or Ar], or PhOH, provided that a compound of general Formula IV is chosen to have at least one phenolic group present.

Enolisable materials such as those compounds of the general formula below are also suitable for use herein.

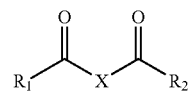

where R$_1$ or R$_2$ are NR'C(=O)NR"R'" [where R' is H, alkyl, Ph, or Ar; R" is H, alkyl, Ph, or Ar; and R'" is H, alkyl, Ph, or Ar], or OR [where R is H, alkyl, Ph, or Ar]; X is (CH$_2$)$_n$, C(R)$_2$ [where R is alkyl, Ph, Ar, or CN], O, S, NR [where R is H, alkyl, Ph, or Ar], and n is 1-10.

The enolisable material of the preceding paragraph may be selected from compounds of the general formula below:

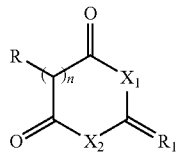

where
(a) $X_1=X_2=NH$, $R=H$, $R_1=O$, $n=1$; or
(b) $X_1=X_2=NH$, $R_1=O$, n is zero so that the cyclic structure has a five membered ring; or
(c) $X_1=X_2=O$, $R=H$, $R_1=(CH_3)_2$, $n=1$; or
(d) $X_1=X_2=O$, $R=Ph$, $R_1=(CH_3)_2$, $n=1$.

In the general formulae above for the solid organic acids, Ar represents substituted phenyl, substituted or unsubstituted bicyclic or multicyclic aromatic compounds, e.g., naphthalene, substituted naphthalene, and the like and Ph is phenyl. Bn is a substituted or unsubstituted benzyl group. Alkyl may be straight chained or branched $C_1$-$C_{20}$ alkyl, suitably $C_1$-$C_{10}$ alkyl. Haloalkyl should be interpreted as an alkyl substituted one or more times by one or more halogens. Alkenyl may be straight chain or branched $C_2$-$C_{20}$ alkenyl, suitably $C_2$-$C_{10}$ alkenyl.

The solid organic acid may for example be selected from 4-nitroguaiacol, 3,4,5-trimethoxy benzoic acid, hexachlorophene, 3,5-dinitrosalicylic acid, 4,5,7-trihydroxyflavanone, 2,2-dithiosalicylic acid, phloroglucinol, fumaric acid, 3,4-dihydroxy benzoic acid, 3,4,5-trihydroxy benzoic acid, trolox, pamoic acid, ascorbic acid, salicylic acid, citric acid, 3,4-dihydroxy cinnamic acid, 2,3-dicyanohydroquinone, barbituric acid, tetrahydroxy-p-benzoquinone, parabanic acid, phenyl boronic acid, 5-phenyl Meldrum's acid and Meldrum's acid.

Of these acids those which display a greater stabilising effect are barbituric acid, Trolox, and fumaric acid with barbituric acid displaying a better stabilising effect. A number of solid organic acids which are set out below, and for ease of discussion herein only, have been classified into four different groups.

EXAMPLES OF SOLID ORGANIC ACIDS

| Phenolic Functional Groups | Carboxylic Functional Groups |
| --- | --- |
| 4-nitroguaiacol | 3,4,5-trimethoxy benzoic acid |
| hexachlorophene | 3,5-dinitrosalicylic acid |
| 4,5,7-trihydroxyflavanone | 2,2-dithiosalicylic acid |
| phloroglucinol | fumaric acid |
| | 3,4-dihydroxy benzoic acid |
| | 3,4,5-trihydroxy benzoic acid |
| | Trolox (6-hydroxy-2,5,7,8-tetramethylchroman-2 carboxylic acid) |
| | pamoic acid |
| | ascorbic acid |
| | salicylic acid |
| | citric acid |
| | 3,4-dihydroxy cinnamic acid |
| Quinone Derivatives | Enolisable Acids |
| 2,3-dicyanohydroquinone | barbituric acid |
| tetrahydroxy-p-benzoquinone | parabanic acid |
| | phenyl boronic acid |
| | 5-phenyl Meldrum's acid |
| | Meldrum's acid |

Conditions suitable to cure the inventive compositions include exposing the compositions to a temperature of at least about 120° C. but less than about 190° C. for about 0.5 up to about 60 minutes, such as 30 minutes at 180° C.

More specifically, the inventive adducts may also be used as latent curatives for the thermosetting resin, if they contain a thiol and/or amine functional group or if they are reacted to become functionalized with such a group. In addition, they may be used to prepare compositions capable of curing at temperatures lower than those set forth above, such as at about 100° C.

The inventive compositions may also be formulated as one part compositions or two part compositions, as desired. In a one part composition, it may be desirable to grind the inventive adduct to a uniform particle size, such as by cryogenic grinding techniques, to ensure a dispersable particle size. In a two part composition, the inventive adduct may be solubilized in one of the parts.

The present invention provides methods for adhesively attaching a first article to a second article. Such methods include (a) applying an inventive composition to a first article, (b) bringing together the first article and a second article into intimate contact to form an assembly, where the first article and the second article are separated only by the adhesive composition applied in step (a), and thereafter, (c) subjecting the assembly to conditions suitable to cure the composition.

In accordance with yet another embodiment of the present invention, there are provided assemblies produced by these methods.

The invention will now be illustrated by way of the following examples.

EXAMPLES

Example 1

General Preparation of Polyurethane Type Adducts 1-6

One equivalent of a functionalized polyether or polydimethyl siloxane backbone material (such as one terminated at each end with one of hydroxyl, amino, mercapto or carboxyl) is reacted with 2 equivalents of a diisocyanate (e.g., hexamethylene diisocyanate or isophorone diisocyanate) by bringing into contact the two materials with or without the presence of a chain extender, such as trimethylol propane, under appropriate catalysis at a temperature between 20 and 100° C., particularly between 60 and 80° C., under an inert atmosphere. The reaction is maintained until the isocyanate content reaches a value indicative of complete reaction and the formation of an isocyanate terminated polyurethane adduct.

The above isocyanate terminated polyurethane adduct is used as an intermediate to be capped by reaction of the terminal isocyanate functional groups with a mercaptan capping agent, such as 3,6-dioxa-1,8-octane dithiol.

In this manner Adducts 1-6 may be synthesised.

In the case of Adduct 5 a blend of a hydroxy functionalised polyether and a hydroxy terminated polydimethyl siloxane are reacted in the presence of a trimethylol propane chain extender with the appropriate equivalents of diisocyanate. The terminal isocyanate groups are then capped with an appropriate mercaptan capping agent, such as 3,6-dioxa-1,8-octane dithiol.

Example 2

Preparation of A-B-A Block Copolymer Type Adducts 7-13

Here, A-B-A block copolymer type materials of structures 7-13 are prepared and are subsequently reacted as in Example 1 above to prepare Adducts 14-20.

More specifically, the A-B-A block copolymer materials are prepared by reacting an appropriate amount (two equivalents for example) of a suitable Block A material such as an amine functional polyether, a ∈-caprolactone, or an amine terminated rubber such as a Hycar rubber material with one equivalent of a functionalised polyether or polydimethyl siloxane Block B material such as one terminated with (meth)acrylate groups, or anhydride groups. Alternately, the Block B material may be first reacted with a diisocyanate to form an isocyanate functional pre-polymer which is then reacted with the appropriate Block A material.

Suitable A-B-A Block copolymer materials include the reaction products of:

- amino/mercapto/hydroxy terminated Block B material with a lactone such as caprolactone [structure 7],
- an anhydride terminated Block B material with one or more equivalents of an amine/mercapto/hydroxy terminated Block A material [structure 8].
- Structure 8 may also be subjected to appropriate heat treatment to effect ring closure to form the corresponding imide structure [structure 9].
- an amine- or mercapto-containing polyether material by Michael addition reaction of one or more equivalents of a, for example, a JEFFAMINE onto an acrylate [structure 10] or methacrylate [structure 11] terminated Block B material.
- a hydroxy- or carboxyl-containing Block B material with a diisocyanate under appropriate catalysis conditions, and capping the terminal isocyanate groups with a hydroxy- or amino-terminated polyether, such as a JEFFAMINE [structure 12], or an amino terminated rubber such as a HYCAR rubber material [structure 13].

The Block A and B materials in proper stoichiometric amounts are heated to an appropriate temperature for a period of time, such as 1 to 24 hours, depending on the nature and identity of the reactants, to form the A-B-A block copolymer materials of structures 7-13.

The A-B-A Block copolymer materials of structures 7-13 are then reacted as in Example 1 i.e. one equivalent of an appropriate amine/hydroxyl terminated A-B-A Block copolymer is reacted with 2 equivalents of a diisocyanate (e.g. hexamethylene or isophorone diisocyanate) by bringing into contact the two materials with or without the presence of a chain extender, such as trimethylol propane, under appropriate catalysis at a temperature between 20 and 100° C., particularly between 60 and 80° C., under an inert atmosphere. The reaction is maintained until the isocyanate content reaches a value indicative of complete reaction and the formation of an isocyanate-terminated polyurethane adduct.

The above isocyanates-terminated polyurethane adduct is used as an intermediate to be capped by reaction of the terminal isocyanate functional groups with a mercaptan capping agent, such as 3,6-dioxa-1,8-octane dithiol.

In this manner Adducts 14-20 may be synthesised.

Example 3

The following versions of Adduct 1 were prepared in accordance with the procedure outlined in Example 1, using various hydroxyl functional polyether backbone materials of different molecular weights and with or without a chain extender such as trimethylol propane.

Adduct 1a

Polytetrahydrofuran with a molecular weight of 2000 under the tradename TERATHANE 2000 [200 g, 0.1 mol], 1,6-diisocyanato hexane [34.47 g, 0.205 mol] and trimethylol propane [2.5 g, 0.018 mol] were mixed with heating to a temperature of 65° C. under an inert atmosphere in a reactor vessel equipped with a mechanical stirrer and a thermometer. On dissolution of the trimethylol propane, a catalytic amount of dibutyl tin dilaurate was added to the stirring mixture to initiate reaction, evidence of which was observed by a rise in temperature. The mixture was allowed to continue to stir for a period of time of 1 hour. When the temperature receded to a temperature of 80° C., 1,2-bis(2-mercaptoethoxy)ethane [38.28 g, 0.209 mol] was added as a single aliquot and the mixture stirred for a further period of time of 1.5 hours and then cooled to room temperature to afford the Adduct 1a as a high viscosity resin.

Adduct 1b

Using the same procedure as described in connection with the formation of Adduct 1a, except that the polytetrahydrofuran used here had a molecular weight of 650 [TERATHANE 650] was employed to form Adduct 1b.

Adduct 1c

Using the same procedure as described in connection with the formation of Adduct 1a, except that no trimethylol propane was added to form Adduct 1c.

Adduct 1d

Using the same procedure as described in connection with the formation of Adduct 1b, except that no trimethylol propane was added to form Adduct 1d.

Adduct 1e

Using the same procedure as described in connection with the formation of Adduct 1a, except that TERATHANE 2000 was replaced by polypropylene glycol with a molecular weight of 2000 to form Adduct 1e.

Adduct 1f

Using the same procedure as described in connection with the formation of Adduct 1a except that a blend of functionalised polyether backbones—a 70:30 mix ratio of TERATHANE 2000/PPG 2000—was used to form Adduct 1f.

Table 1 represents a set formulations (Sample Nos. I-IV) prepared with Adducts 1a-1d.

TABLE 1

| Component | | Sample Nos./Amt (wt %) | | | |
|---|---|---|---|---|---|
| Type | Identity | I | II | III | IV |
| Epoxy | EPON 828 | 8.4 | 8.4 | 8.4 | 8.4 |
|  | ADEKA EP 49-10N | 7.0 | 7.0 | 7.0 | 7.0 |
| Toughener | Adduct 1a | 17.7 | — | — | — |
|  | Adduct 1b | — | 17.7 | — | — |
|  | Adduct 1c | — | — | 17.7 | — |
|  | Adduct 1d | — | — | — | 17.7 |
|  | ZEON F351 | 9.9 | 9.9 | 9.9 | 9.9 |
|  | KANEKA MX 153 | 44.4 | 44.4 | 44.4 | 44.4 |
| Filler | CABOSIL TS 720 | 3.1 | 3.1 | 3.1 | 3.1 |
|  | MONARCH 280 | 0.3 | 0.3 | 0.3 | 0.3 |
|  | CAO | 3.1 | 3.1 | 3.1 | 3.1 |
| Curative | DYHARD UR 700 | 1.0 | 1.0 | 1.0 | 1.0 |
|  | DYHARD 100S | 5.1 | 5.1 | 5.1 | 5.1 |

EP 49-10N = chelate modified epoxy resin adhesion promoter, commercially available from Adeka
ZEON F351 = core shell particles Table 1 shows four formulations each using a different version of Adduct 1. The different versions of Adduct 1—Adducts 1a-1d—have different molecular weight backbones (650 or 2000) and with/without chain extender.

TABLE 2

| T-Peel Strength (N mm) | | Sample Nos. | | | |
|---|---|---|---|---|---|
| | | I | II | III | IV |
| Oiled HDG Steel [250 μm gap, 100 mm/min] | χ | 9.07 | 11.44 | 8.50 | 9.52 |
| | σ | 0.12 | 0.85 | 0.13 | 1.21 |
| | Failure Mode* | af | af | af | af |
| Oiled EG Steel [250 μm gap, 100 mm/min] | χ | 7.38 | 7.29 | 6.09 | 6.52 |
| | σ | 0.79 | 1.57 | 0.31 | 0.02 |
| | Failure Mode* | af | Af | af | af |
| Oiled CR Steel [250 μm gap, 200 mm/min] | χ | 11.50 | 15.07 | 13.51 | 16.33 |
| | σ | 1.30 | 1.80 | 0.66 | 1.07 |
| | Failure Mode* | af | af | af | af |

*af = adhesive failure, cf = cohesive failure
χ is the mean result,
σ is standard deviation.

Table 2 shows that each version of Adduct 1 gives good T-peel strength/adhesion on various types of oiled steel.

TABLE 3

| Wedge Impact Peel (N mm) @ | | Sample Nos. | | | |
|---|---|---|---|---|---|
| | | I | II | III | IV |
| RT | χ | 49.73 | 39.44 | 45.80 | 39.08 |
| | σ | 2.36 | 3.53 | 0.15 | 1.33 |
| | Failure Mode* | cf | af | af | af |
| −40° C. | χ | 50.80 | 2.46 | 47.84 | 4.28 |
| | σ | 2.43 | 1.89 | 0.71 | 0.81 |
| | Failure Mode* | cf | af | 75% cf | af |

*af = adhesive failure, cf = cohesive failure
χ is the mean result,
σ is standard deviation.

Table 3 shows that each version of Adduct 1 demonstrates excellent wedge impact peel values at room temperature and −40° C. Table 3 also demonstrates that Adducts 1b and 1d (in Sample Nos. II and IV, respectively) have poor impact peel at −40° C. In contrast, Adducts 1a and 1c (in Sample Nos. I and III, respectively) provide low temperature toughness.

TABLE 4

| Component | | Sample Nos./Amt. (wt %) | | | | | |
|---|---|---|---|---|---|---|---|
| Type | Identity | V | VI | VII | VIII | IX | X |
| Epoxy | EPON 828 | 8.0 | 12.0 | 8.0 | 11.6 | 11.6 | 11.6 |
| | CARDOLITE 2513 | 1.6 | 1.6 | 1.6 | — | — | — |
| | EP49-10N | 6.0 | 6.0 | 6.0 | 2.0 | 2.0 | 2.0 |
| Toughener | Prepo 2000LV | 15.0 | — | — | 15.0 | — | — |
| | Adduct 1a | — | 15.0 | — | — | 15.0 | — |
| | Adduct 1e | — | — | 15.0 | — | — | 15.0 |
| | DY965 CH | — | — | — | 7.0 | 7.0 | 7.0 |
| | QR 9466 | 4.4 | 4.4 | 4.4 | — | — | — |
| | ZEON F351 | 7.2 | 7.2 | 7.2 | 6.0 | 6.0 | 6.0 |
| | KANEKA MX 153 | 42.0 | 42.0 | 42.0 | 42.0 | 42.0 | 42.0 |
| Adhesion Promoter | ZP5070 HV | 2.0 | 2.0 | 2.0 | 2.0 | 2.0 | 2.0 |
| | SILQUEST A-187 | 0.2 | 0.2 | 0.2 | 0.2 | 0.2 | 0.2 |
| | TCP | 2.0 | 2.0 | 2.0 | 2.2 | 2.2 | 2.2 |
| | NIPOL 1411 | — | — | — | 1.0 | 1.0 | 1.0 |
| | NYAD 400 | — | — | — | 1.4 | 1.4 | 1.4 |
| | CaO | 3.0 | 3.0 | 3.0 | 2.0 | 2.0 | 2.0 |
| | SYLOTHIX 53 | — | — | — | 0.5 | 0.5 | 0.5 |
| | CABOSIL TS 720 | 3.0 | 3.0 | 3.0 | 1.5 | 1.5 | 1.5 |
| Curative | DYHARD UR700 | 1.0 | 1.0 | 1.0 | 1.0 | 1.0 | 1.0 |
| | DYHARD 100S | 4.6 | 4.6 | 4.6 | 4.7 | 4.7 | 4.7 |

DY965CH = PU adduct, commercially available from Huntsman (now Hexcion)
ZP5070HV = adhesion promoter
SILQUEST A187 = alkoxy silane epoxy adhesion promoter
TCP = tricresyl phosphate
NIPOL 1411 = acrylonitrile-butadiene rubber for adhesion
SYLOTHIX 53 = thixotrope thickener Table 4 provides structural adhesive formulations of two adducts using—Adducts 1a and 1e—with similar molecular weight backbones (about 2000) but based on different polyether backbones—i.e., PPG 2000 and polyTHF 2000.

TABLE 5

| Wedge Impact Peel (N mm) @ | | Sample Nos. | | | | | |
|---|---|---|---|---|---|---|---|
| | | V | VI | VII | VIII | IX | X |
| RT | χ | 40.0 | 44.5 | 45.3 | 37.0 | 42.6 | 45.2 |
| | σ | 0.3 | 1.5 | 3.3 | 1.9 | 4.1 | 1.9 |
| −40° C. | χ | 27.0 | 42.9 | 39.2 | 30.5 | 46.3 | 39.1 |
| | σ | 0.5 | 1.8 | 1.5 | 0.4 | 3.2 | 1.8 |

Table 5 compares Adducts 1a and 1e in structural adhesive formulations. The performance results of the evaluation of the formulations indicate that replacing polyTHF 2000 in the adduct backbone with PPG 2000 shows some loss of toughness. But, overall the results for both adducts are excellent compared to control Sample Nos. V and VIII, which contain Prepo2000LV and neither adduct.

TABLE 6

| Component | | Sample Nos./ Amt (wt %) | |
|---|---|---|---|
| Type | Identity | XI | XII |
| Epoxy | EPON 828 | 15.6 | 15.6 |
| | EP 49-10N | 2.0 | 2.0 |
| Toughener | Adduct 1f* | 15.0 | 15.0 |
| | ZEON F351 | 6.0 | — |
| | DY965 CH | 7.0 | 7.0 |
| Filler | NIPOL 1411 | 1.0 | 1.0 |
| | CABOSIL TS 720 | 1.5 | 1.5 |
| | CALCIUM OXIDE | 2.0 | 2.0 |
| | SYLOTHIX 53 | 0.5 | 0.5 |
| Adhesion Promoter | SILQUEST A-187 | 0.2 | 0.2 |
| | ZP5070HV | 2.0 | 2.0 |
| | TCP | 2.2 | 2.2 |
| Curative | DICY | 4.7 | 4.7 |
| | DYHARD UR700 | 1.0 | 1.0 |

*70% polyTHF + 30% PPG 2000 + TMP + HMDI + 3,6-dioxa-1,8-octane dithiol

Table 6 shows Sample Nos. XI and XII as structural adhesive formulations that use Adduct 1f as an additional toughener. The results of the wedge impact evaluations of Sample Nos. XI and XII are set forth below in Tables 7 and 8.

The evaluation in Table 7 was conducted on grit blasted mild steel impact peel test coupons of a 0.8 mm thickness in accordance with ISO 11343, using a bondline thickness of 0.25 mm for wedge impact performance at room temperature and −40° C., for dynamic resistance and impact energy.

TABLE 7

| Wedge Impact @ | Sample Nos. | |
|---|---|---|
| | XI | XII |
| RT | | |
| 160° C. for 22 minutes | 40.7 ± 1.1 | 43.2 ± 1.3 |
| 180° C. for 30 minutes | 43.3 ± 0.7 | 47.4 ± 0.7 |
| 190° C. for 1 hour | 34.1 ± 2.7 | 31.6 ± 4.8 |
| −40° C. | | |
| 160° C. for 22 minutes | 32.6 ± 0.6 | 32.7 ± 2.0 |
| 180° C. for 30 minutes | 37.3 ± 1.5 | 40.6 ± 0.3 |
| 190° C. for 1 hour | 27.6 ± 2.1 | 33.3 ± 3.0 |

The evaluation in Table 8 was conducted on oiled hot dipped galvanized steel peel test coupons of a 0.8 mm thickness in accordance with ISO 11343, using a bondline thickness of 0.25 mm for T peel strength at 180° C.

TABLE 8

| T-Peel Strength @ 180° C. | Sample Nos. | |
|---|---|---|
| | XI | XII |
| HDG 100 mm/min oiled | 10.9 | 8.6 |
| % Cohesive Failure | 10 | 5 |
| EGS 100 mm/min oiled | 9.1 | 5.7 |
| % Cohesive Failure | 0 | 0 |
| CRS 200 mm/min oiled | 13.7 | 13.5 |
| % Cohesive Failure | 0 | 0 |

In Table 12, Sample Nos. XVI, XVII, XVIII and XIX have been prepared with increasing levels of barbituric acid for comparison against Sample No. XVI, which contain no barbituric acid.

TABLE 12

| Component | | Sample Nos./Amt. (parts) | | | |
|---|---|---|---|---|---|
| Type | Identity | XVI | XVII | XVIII | XIX |
| | EPON 828 | 15.6 | 15.6 | 15.6 | 15.6 |
| | ADEKA EP 49-10N | 2.0 | 2.0 | 2.0 | 2.0 |
| Stabiliser | Barbituric acid | — | 2.0 | 4.0 | 6.0 |
| Toughener | Adduct 1a | 15.0 | 15.0 | 15.0 | 15.0 |
| | DY 965 CH | 7.0 | 7.0 | 7.0 | 7.0 |
| | ZEON F351 | 6.0 | 6.0 | 6.0 | 6.0 |
| | KANEKA MX 153 | 42.0 | 42.0 | 42.0 | 42.0 |
| Adhesion Promoter | ZP5070 HV | 2.0 | 2.0 | 2.0 | 2.0 |
| | TCP | 2.2 | 2.2 | 2.2 | 2.2 |
| | SILQUEST A-187 | 0.2 | 0.2 | 0.2 | 0.2 |
| Filler | NIPOL 1411 | 1.0 | 1.0 | 1.0 | 1.0 |
| | NYAD 400 | 1.4 | 1.4 | 1.4 | 1.4 |
| | CaO | 2.0 | 2.0 | 2.0 | 2.0 |
| | CABOSIL TS 720 | 1.5 | 1.5 | 1.5 | 1.5 |
| | SYLOTHIX 53 | 0.5 | 0.5 | 0.5 | 0.5 |
| Curative | DYHARD 100S | 4.7 | 4.7 | 4.7 | 4.7 |
| | DYHARD UR 700 | 1.0 | 1.0 | 1.0 | 1.0 |

As seen in Table 13, the addition of barbituric acid was shown to stabilize the viscosity of the formulations.

TABLE 13

| Viscosity Stability @ 50° C. | | Sample Nos. | | | |
|---|---|---|---|---|---|
| | | XVI | XVII | XVIII | XIX |
| Initial | Yield Point | 2004 | 1847 | 1933 | 1643 |
| | η @ 20 seconds | 164.3 | 151.3 | 155.7 | 136.8 |
| 16 Hours @ 50° C. | Yield Point | 12560 | 5841 | 4786 | 4376 |
| | η @ 20 seconds | 696.4 | 344.6 | 296.6 | 275.6 |

TABLE 13-continued

| Viscosity Stability @ 50° C. | | Sample Nos. | | | |
|---|---|---|---|---|---|
| | | XVI | XVII | XVIII | XIX |
| 40 Hours @ 50° C. | Yield Point | Torque Overload | Torque Overload | 6214 | 6362 |
| | η @ 20 seconds | Torque Overload | Torque Overload | 376.6 | 375.2 |
| 64 Hours @ 50° C. | Yield Point | Torque Overload | Torque Overload | 9646 | 8830 |
| | η @ 20 seconds | Torque Overload | Torque Overload | 559.9 | 526.4 |

Table 14 provides Sample No. XX containing Adduct 1a that was prepared for determination of fracture toughness. Fracture toughness ("Glc") is measured using the tapered double cantilever beam methodology as laid out in STM-799, using an adhesive layer thickness of 1.0-5 mm, a pull rate of 0.1 mm/min, a test temperature of 21-23° C. on grit blasted steel substrates.

TABLE 14

| Component | | Sample No./Amt (wt %) |
|---|---|---|
| Type | Identity | XX |
| Epoxy | EPON 828 | 13.17 |
| | EP 49-10N | 1.78 |
| Toughener | Kaneka MX 153 | 41.0 |
| | Adduct 1a | 15.0 |
| | ZEON F351 | 6.0 |
| | Adeka QR9466 | 7.0 |
| Filler | NIPOL 1411 | 1.0 |
| | CABOSIL TS 720 | 1.5 |
| | CALCIUM OXIDE | 2.0 |
| | SYLOTHIX 53 | 0.5 |
| | NYAD 400 WOLLASTOCOAT | 1.40 |
| Adhesion Promoter | SILQUEST A-187 | 0.15 |
| | ZP5070HV | 2.0 |
| | TCP | 2.2 |
| Curative | Amicure CG 1200 | 4.3 |
| | DYHARD UR700 | 1.0 |

Sample No. XX was evaluated for fracture toughness, results of which are summarized below in Table 15.

TABLE 15

| Specimen No. | $G_{1c}$ Integral $J/m^2$ |
|---|---|
| 1 | 7553 |
| 2 | 6930 |
| 3 | 7606 |
| 4 | 7187 |
| 5 | 7750 |
| Mean | 7405 |
| σ | 337.124 |

What is claimed is:

1. An adduct selected from the group consisting of:

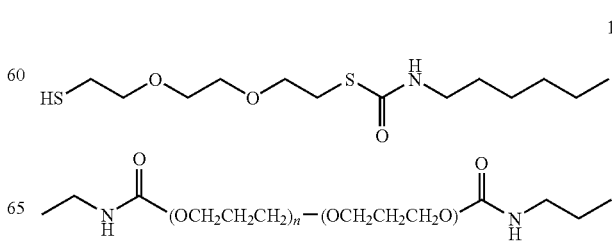

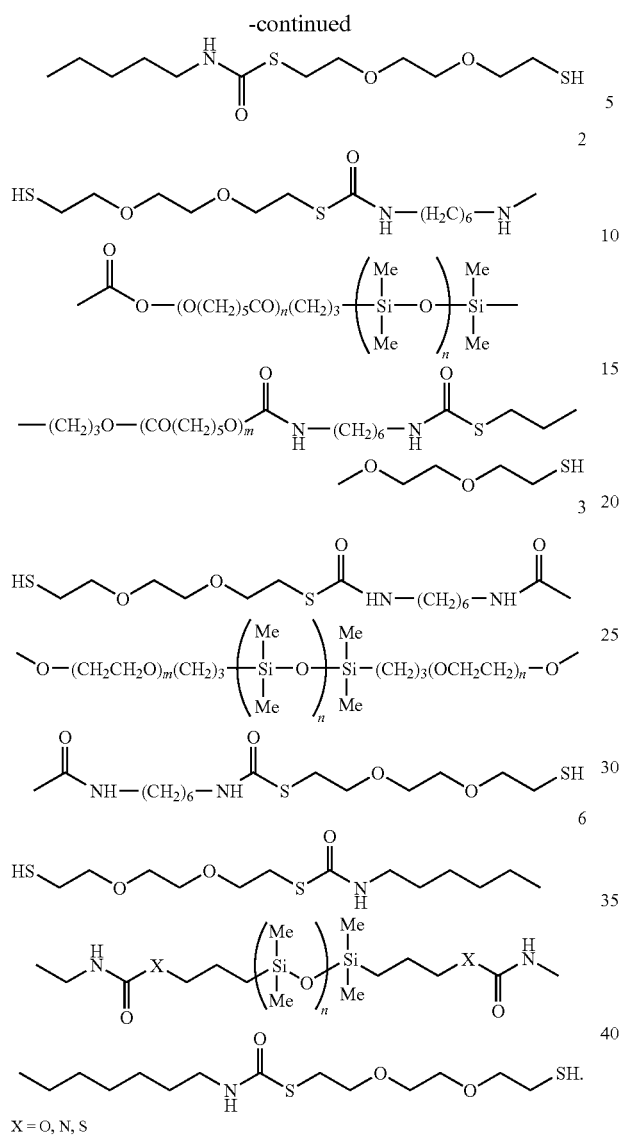

X = O, N, S

2. A thermosetting resin formulation comprising:
(a) adduct of claim 1; and
(b) a thermosetting resin.

3. The formulation of claim 2, wherein the thermosetting resin is a member selected from the group consisting of epoxy, episulfide, benzoxazines and combinations thereof.

4. The formulation of claim 2, further comprising a solid organic acid.

5. The formulation of claim 4, wherein the solid organic acid is a member selected from the group consisting of quinones, phenols, and enolisable materials.

6. The formulation of claim 4, wherein the solid organic acid is a member selected from the group consisting of be selected from 4-nitroguaiacol, 3,4,5-trimethoxy benzoic acid, hexachlorophene, 3,5-dinitrosalicylic acid, 4,5,7-trihydroxyflavanone, 2,2-dithiosalicylic acid, phloroglucinol, fumaric acid, 3,4-dihydroxy benzoic acid, 3,4,5-trihydroxy benzoic acid, trolox, pamoic acid, ascorbic acid, salicylic acid, citric acid, 3,4-dihydroxy cinnamic acid, 2,3-dicyanohydroquinone, barbituric acid, tetrahydroxy-p-benzoquinone, parabanic acid, phenyl boronic acid, 5-phenyl Meldrum's acid and Meldrum's acid.

7. The formulation of claim 2, wherein the thermosetting resin is a member selected from the group consisting of

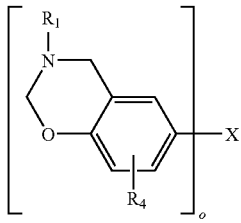

BOZ-A wherein o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from hydrogen, alkyl, alkenyl and aryl, and $R_4$ is selected from hydrogen, halogen, alkyl and alkenyl;

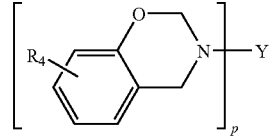

BOZ-B wherein p is 2, Y is selected from biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from hydrogen, halogen, alkyl and alkenyl.

8. The formulation of claim 2, further comprising a toughener.

* * * * *